(12) United States Patent
Boulange

(10) Patent No.: US 11,961,211 B2
(45) Date of Patent: Apr. 16, 2024

(54) RADIOMIC SYSTEMS AND METHODS

(71) Applicant: Deeplook, Inc., Silver Spring, MD (US)

(72) Inventor: Kenneth Boulange, Discovery Bay, CA (US)

(73) Assignee: Deeplook, Inc., Silver Spring, MD (US)

( * ) Notice: Subject to any disclaimer, the term of this patent is extended or adjusted under 35 U.S.C. 154(b) by 231 days.

(21) Appl. No.: 17/400,616

(22) Filed: Aug. 12, 2021

(65) Prior Publication Data

US 2022/0215513 A1 Jul. 7, 2022

Related U.S. Application Data

(63) Continuation-in-part of application No. 16/890,496, filed on Jun. 2, 2020, now abandoned, which is a continuation of application No. 16/428,125, filed on May 31, 2019, now Pat. No. 10,726,526.

(60) Provisional application No. 63/231,697, filed on Aug. 10, 2021, provisional application No. 62/678,644, filed on May 31, 2018.

(51) Int. Cl.
*G06T 5/00* (2006.01)
*G06T 5/50* (2006.01)

(52) U.S. Cl.
CPC ............... *G06T 5/003* (2013.01); *G06T 5/50* (2013.01); *G06T 2207/10116* (2013.01); *G06T 2207/20221* (2013.01); *G06T 2207/30068* (2013.01)

(58) Field of Classification Search
None
See application file for complete search history.

(56) References Cited

U.S. PATENT DOCUMENTS

| | | | |
|---|---|---|---|
| 2005/0207630 A1* | 9/2005 | Chan | G06T 7/0012 382/131 |
| 2009/0214096 A1* | 8/2009 | Andrushkiw | G06T 7/0012 702/19 |
| 2010/0135562 A1* | 6/2010 | Greenberg | G16H 30/20 382/254 |

* cited by examiner

*Primary Examiner* — Edward Park
(74) *Attorney, Agent, or Firm* — Davis Malm & D'Agostine, P.C.; David J. Powsner

(57) ABSTRACT

The invention provides systems, apparatus and methods for digital image processing providing enhanced display of and radiomics generated from images generated from x-ray and other medical imaging data. Such systems, apparatus and methods capture and use that data to identify distinct gradations, e.g., of grayscale within and beyond the spectrum of human vision, then delineate borders based on ranges of gradation, forming irregular multi-layer visual objects with delineated internal contouring and an outer boundary, and then enhance the delineated layers and superimpose the enhancing display over and/or determine radiomic measures of the corresponding areas of the original image, thereby revealing underlying morphology of masses previously obscured, hidden or "masked" from human vision.

16 Claims, 18 Drawing Sheets

The *DeepLook* pop-up window views radiologic images. The images above display the same mammogram, with and without *DeepLook*.

FIG. 10

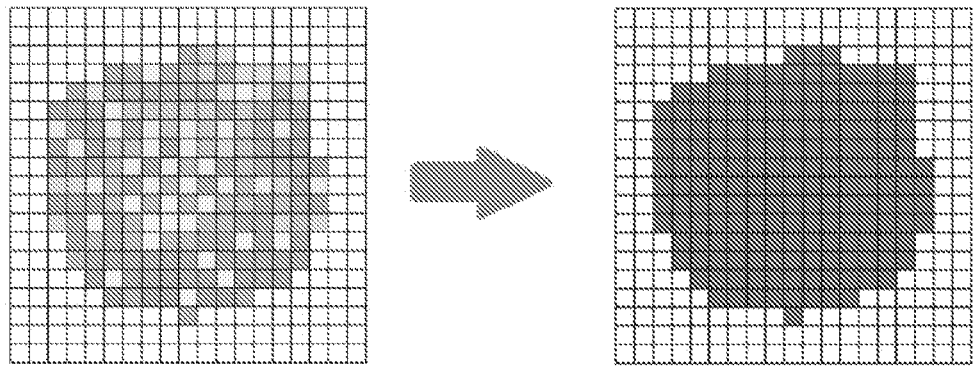

The software groups pixels deemed similar in brightness on a continuum of the grayscale, creating areas of contiguousness that reveal outlined shapes called Growth Rings.

FIG. 11

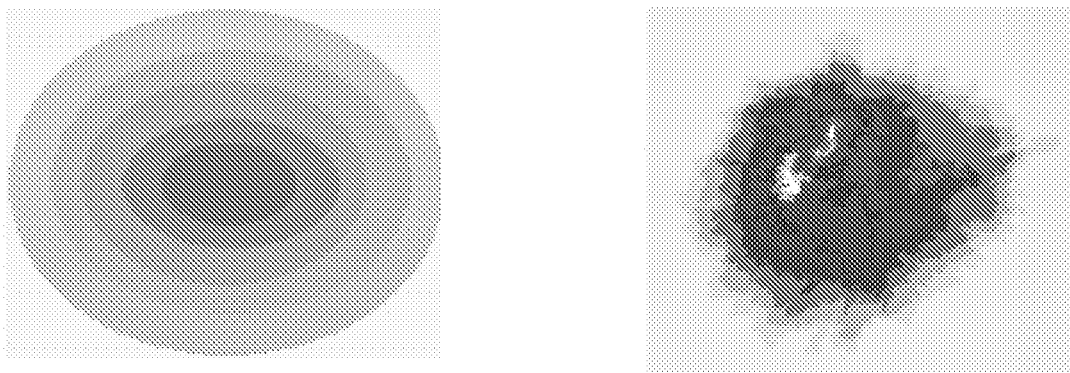

Conceptual PGM          Malignant Mass PGM

On the left is a conceptual Pixel Gradation Mass. On the right is a mammogram with converging growth points

FIG. 12

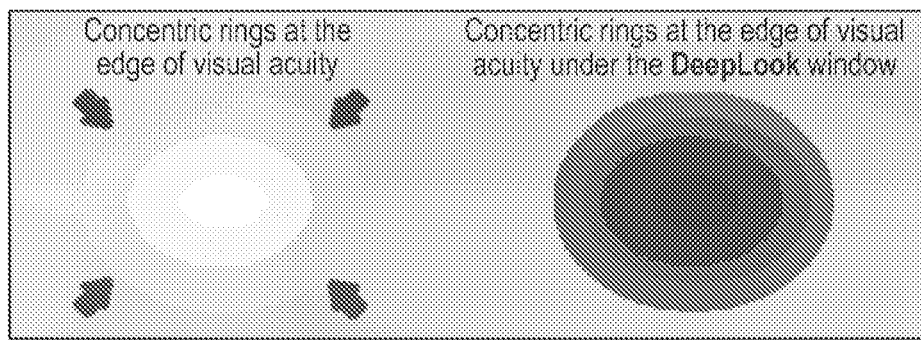

Two versions of the same concentric rings, with (right) and without (left) use of the DeepLook software.

FIG. 13
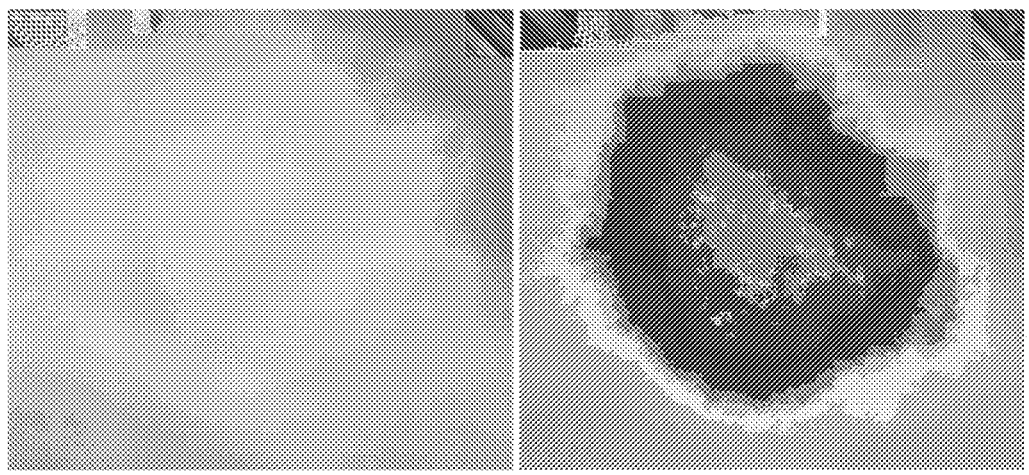
Two views of same mammogram with (right) and without (left) the use of DeepLook software.
FIG. 14                          The number of GRs define the PGM.
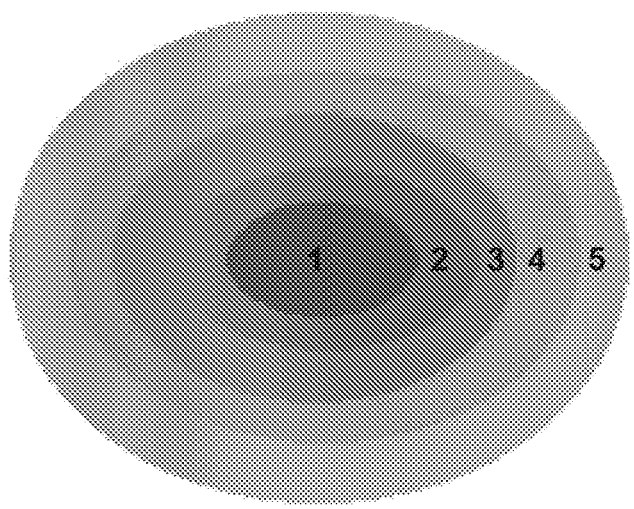

Density of a mass is determined by calculating the average area of increase as GRs extend outward.

Whiteness of a PGM is determined by the brightness of the center Growth Ring(s)

FIG. 17 The pop-up window default settings can be modified by the user by adjusting any of four inter-related variables on a drop-down menu shown below.

RADIOMIC SYSTEMS AND METHODS

REFERENCE TO RELATED APPLICATIONS

This application claims the benefit of U.S. Provisional Patent Application Ser. No. 63/231,697, filed Aug. 10, 2021, entitled "Radiomic Systems and Methods." This application is also a continuation in part of U.S. patent application Ser. No. 16/890,496, filed Jun. 2, 2020, entitled "Digital Image Analysis And Display System Using Radiographic Attenuation Data," which is a continuation of U.S. patent application Ser. No. 16/428,125, filed May 31, 2019, entitled "Digital Image Analysis And Display System Using Radiographic Attenuation Data," which claims the benefit of priority of U.S. Provisional Patent Application Ser. No. 62/678,644, filed May 31, 2018, and entitled "Radiologic Image Viewer." The teachings of all of the foregoing applications and patents are incorporated by reference herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The computer program listing contained in the ASCII file named "SoftwareAppendix1-ASCII.txt", created Aug. 9, 2021, having a length of 15,944 bytes, submitted herewith to the USPTO in compliance with MPEP 608.05 is incorporated by reference herein.

The computer program listing contained in the ASCII file named "NormalizedPixelDensity-ASCII.txt", created Aug. 10, 2021, having a length of 4,871 bytes, submitted herewith to the USPTO in compliance with MPEP 608.05 is incorporated by reference herein.

The computer program listing contained in the ASCII file named "marginSpiculationCode-ASCII.txt", created Aug. 10, 2021, having a length of 7,303 bytes, submitted herewith to the USPTO in compliance with MPEP 608.05 is incorporated by reference herein.

The computer program listing contained in the ASCII file named "lesionBalanceCode-ASCII.txt", created Aug. 9, 2021, having a length of 4,148 bytes, submitted herewith to the USPTO in compliance with MPEP 608.05 is incorporated by reference herein.

The computer program listing contained in the ASCII file named "centralizedDensityCode-ASCII.txt", created Aug. 9, 2021, having a length of 20,138 bytes, submitted herewith to the USPTO in compliance with MPEP 608.05 is incorporated by reference herein.

The computer program listing contained in the ASCII file named "additionalDensitySupportcode-ASCII.txt", created Aug. 9, 2021, having a length of 2,184 bytes, submitted herewith to the USPTO in compliance with MPEP 608.05 is incorporated by reference herein.

BACKGROUND OF THE INVENTION

The first x-ray image of a human body part (a hand) was taken in 1895, launching the discipline of radiology. One of the first medical diagnostic applications a few years later showed a penny lodged in the throat of a child. But using x-rays to distinguish characteristics of soft tissue proved more difficult—as the attenuation of the x-rays (the relative amount that passes through tissue depending on density) is very subtle and hard to distinguish in a resulting black & white "x-ray." It would take years until the first mammography machine were commercially used to detect masses in breast tissue. Those mammograms used x-ray film. Digital mammography was introduced in 1972 and by the 1990s digital mammograms had become standard medical practice—despite some misgivings about the hidden details that some scientists believe were lost when transitioning from analog imaging.

Today, 40 million digital mammograms are generated each year in the US and more than 50 percent now deploy advanced 3D digital mammography called tomosynthesis. Digital mammography has proven able to detect cancer early and is the only screening modality approved by the U.S. Food & Drug Administration. However, mammography is under increasing scrutiny because of persistent shortcomings with both early detection and too many false positives that lead to additional imaging and unwarranted biopsies. Both problems result in deleterious health effects for women and increase operational and litigation costs for healthcare providers. In light of these trends, several current studies reexamine the advisability of recommended screening regimes for all women.

For the majority of patients, mammography works well, but 40 percent of women have dense breast tissue that can "mask" cancer in black-and-white mammograms. This is true because both tumors and naturally occurring dense breast tissue appear as white on black-and-white mammograms. The natural dense tissue can obscure morphological characteristics of the tumor, making it much harder for the radiologist to see the grayscale gradation typically extending from the center of a tumor, where it is densest, to the outlying edges of the tumor that are typically less dense. It also makes it difficult to see extending tentacles indicative of aggressive growth and the spikes and points called spiculation that are telltale characteristics of malignancy. Importantly, women with dense breast tissue also have a higher natural incidence of cancer, so their need for a better screening method is even greater.

Although mammography is an important application of radiological imaging, there are many other medical imaging applications that suffer from shortcomings of the prior art.

Objects of the invention are to provide improved systems, apparatus and methods of medical and, more particularly, digital imaging.

Other objects of the invention are to provide such improved systems, apparatus and methods as are suitable for medical diagnosis and/or treatment.

Further related such objects of the invention are to provide such improved systems, apparatus and methods for medical diagnosis and/or treatment that overcoming shortcomings of the prior art with respect to the foregoing.

SUMMARY OF THE INVENTION

The invention provides systems, apparatus and methods for digital image processing providing enhanced display of elements of images generated from x-ray and other imaging modalities, e.g., characterized by attenuation data converted to grayscale digital format. The invention captures attenuation values used to render digital images and uses the data to identify distinct gradations of the grayscale, incorporating grayscale data, e.g., within and beyond the spectrum of human vision, then recursively delineates borders based on ranges of gradation, forming irregular multi-layer visual objects with delineated internal contouring and an outer boundary, and then enhancing each delineated layer and superimposes the enhancing display over the corresponding area of the original image, thereby revealing underlying morphology of masses previously obscured, hidden or "masked" from human vision. The invention operates on all digital images produced by attenuation values (i.e. x-rays and sound waves); currently the invention is deployed to display organic masses in medical x-ray images, such as mammograms, to assist in diagnostic interpretation.

In other aspects, the invention provides systems, apparatus and methods, e.g., as described above, that include walking the perimeter of a shape in a medical image to generate a list of coordinates defining that perimeter; dividing the list into groups of coordinates divided by inflection points on the perimeter; determining for each group of coordinates a span-to-length ratio, where "span" refers to a distance on a cartesian coordinate system between endpoints of the respective group, and where "length" refers to a sum of distances measured moving along a path defined by the respective group; determining respective percentages that groups having selected span-to-length ratios comprise of a length of the perimeter; and any of enhancing the medical image or identifying a morphology of a tissue imaged in the medical image as a function of those respective percentages.

Still other aspects of the invention provide systems, apparatus and methods, e.g., as described above, that include normalizing pixel intensities in a region of interest of a medical image; determining an average intensity of pixels within a shape that falls at least partially, if not wholly, within the region of interest; determining a percentile ranking that the average is relative to normalized intensities of pixels; and any of enhancing the medical image or identifying a morphology of a tissue imaged in the medical image as a function of the percentile ranking.

Yet still other aspects of the invention provide systems, apparatus and methods, e.g., as described above, that include finding a location of a center of mass of a series of concentric shapes identified in a medical image; determining longest and shortest diameters of the series of concentric shapes; identifying a most intense shape within the series of concentric shapes; finding a location of a center of mass of the shape; determining a relative centralized distance percent as a function of distance a distance between the centers of mass and as a function of the largest and smallest diameters; any of enhancing the medical image or identifying a morphology of a tissue imaged in the medical image as a function of the relative centralized distance percent;

Still yet other aspects of the invention provide systems, apparatus and methods, e.g., as described above, that include determining a bounding box of a series of one or more concentric shapes identified in a medical image; dividing the bounding box into a plurality of equally-sized regions; determining counts within each region of pixels any of above, below or within one or more threshold intensities; comparing counts of pixels determined for each region with counts of pixels in each other region across one or more of (i) an X-axis, as a line of symmetry, (ii) a Y-axis, as a line of symmetry, and (iii) a diagonal combining X- and Y-axes, as a line of symmetry; determining a degree of balance of the series of concentric shapes by totaling results of the comparisons; and, any of enhancing the medical image or identifying a morphology of a tissue imaged in the medical image as a function of the degree of balance.

Other aspects of the invention provide systems, apparatus and methods, e.g., as described above, that include determining a count of shapes in a series of concentric shapes identified in a medical image, and any of enhancing the medical image or identifying a morphology of a tissue imaged in the medical image as a function of that count.

The foregoing and other aspects of the invention are evident in the drawings and in the description that follows.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of the illustrated embodiment may be attained by reference to the drawings, in which:

FIG. 10 depicts contiguous grouping at a single grayscale value that reveals outlined shapes called Growth Rings (GR) in a system according to the invention;

FIG. 11 depicts a conceptual Pixel Gradation Mass (PGM) and a PGM as displayed in a mammogram with converging outward growth points;

FIG. 12 is a graphical illustration of concentric rings representing the Growth Rings seen in a mass on a mammogram in a system according to the invention;

FIG. 13 depicts a mammogram without and without a pop-up utility for image enhancement according to the invention;

FIG. 14 illustrates that a number of Growth Rings identified and delineated define the contours and size of the PGM in a system according to the invention;

DETAILED DESCRIPTION OF THE ILLUSTRATED EMBODIMENT

Figure 1:
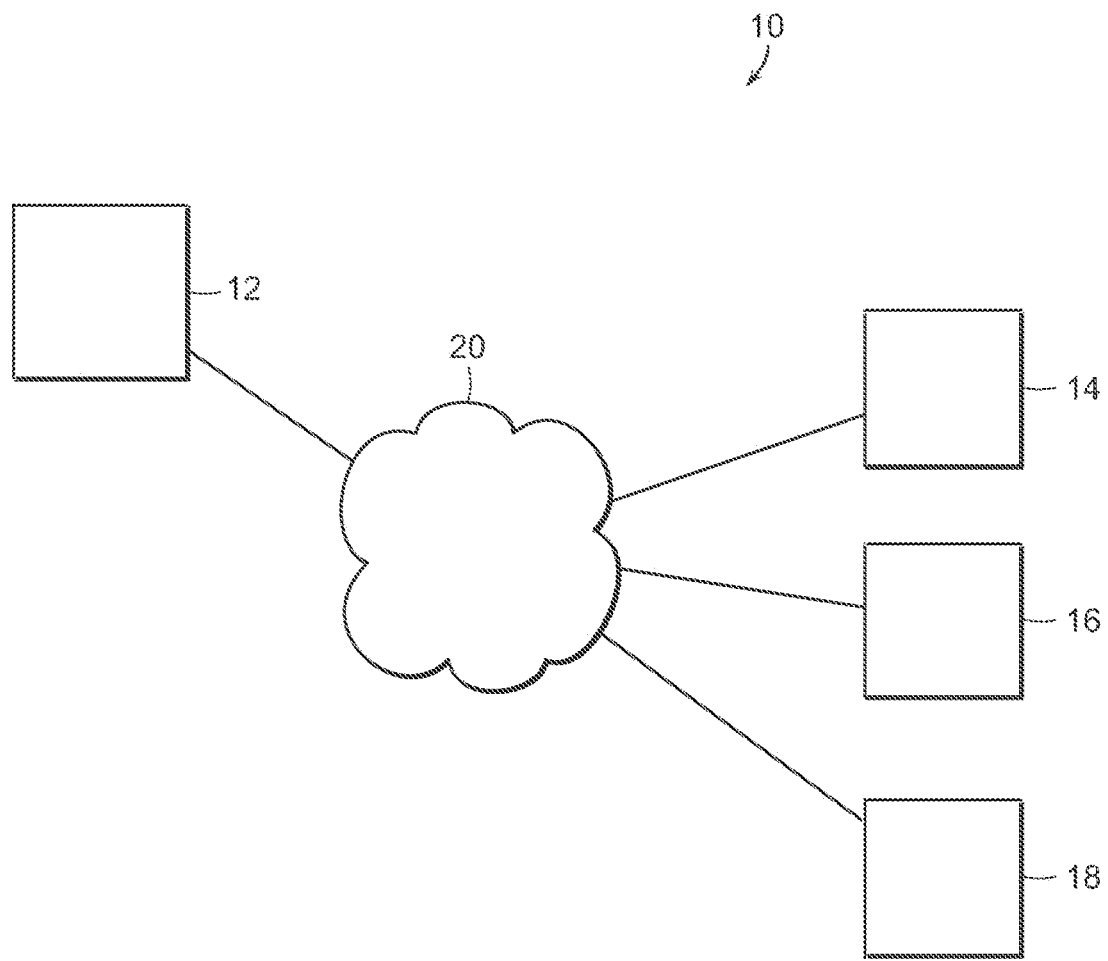
FIG. 1 depicts a system 10 according to one practice of the invention, as well as an environment in which the invention may be practiced.

FIG. 1—Architecture

FIG. 1 depicts a system 10 according to one practice of the invention, as well as an environment in which the invention may be practiced. The illustrated system 10 includes a server digital data device 12 that is coupled to one or more client digital data devices 14-18 via a network 20.

Server digital data device 12 comprises a mainframe, minicomputer, workstation, or other digital data device of the type known in the art as adapted in accord with the teachings hereof for performing the functions attributed to device 12 in the discussion that follows and elsewhere herein. Server 12 may be comprise a stand-alone device or it may be co-housed with other devices of the type shown here or otherwise.

Client digital data devices 14-18 comprises workstations, desktop computers, laptop computers, portable computing devices, smart phones or other digital devices of the type known in the art as adapted in accord with the teachings hereof for performing the functions attributed to those devices 14-18 in the discussion that follows and elsewhere herein. One or more clients 14-18 may comprise stand-alone devices or they may be co-housed with other devices of the type shown here or otherwise. By way of non-limiting example, in some embodiments one or more clients 14-18 may comprise or be co-housed in medical imaging apparatus, such as, by way of non-limiting example, CT scanners, tomosynthesis equipment, while in the same or other embodiments, other such clients may be comprise or be housed in personal digital assistants, smartphones, or otherwise.

Client devices 14-18 may be coupled to graphical displays 14A-18A, respectively, or other output devices (whether integrated with the clients 14-18, networked to them or otherwise) of the type known in the art as adapted in accord with the teachings hereof for displaying and/or otherwise presenting still and/or moving images analyzed by devices 14-18 and, where applicable, by server 12. Server 12 can be similarly coupled to such a graphical display (not shown) in instances where desirable or necessary.

Network 20 comprises local area networks, wide area networks, metropolitan networks, the Internet and/or an other network or communications media (wireless, wired or otherwise) or combination thereof of the type known in the art as adapted in accord with the teachings hereof for supporting the transfer of information (in real-time or otherwise) between the illustrated devices.

It will be appreciated that the embodiment illustrated in FIG. 1 and described above is by way of example that the invention may be practiced in embodiment other than that shown here. Thus, by way of non-limiting example, although a single server and three client devices are shown in the drawing, it will be appreciated that this is by way of example and that other embodiments may include a greater or lesser number of any of those devices. It will be further appreciated that, in some embodiments, the operations ascribed herein to the server 12 may be performed by one or more of the clients 14-18 acting individually or cooperatively and, conversely, that operations ascribed to the client devices 14-18 may be performed by the server 12.

Overview of Operation

Described below are methods of operation of client devices 14-18 for image analysis in accord with the invention. The programming of such devices 14-18 for such purpose is within the ken of those skilled in the art in view of the discussions below and elsewhere herein. As evident in the discussion that follows, those devices can run independently without assistance of a server 12.

Figure 2:
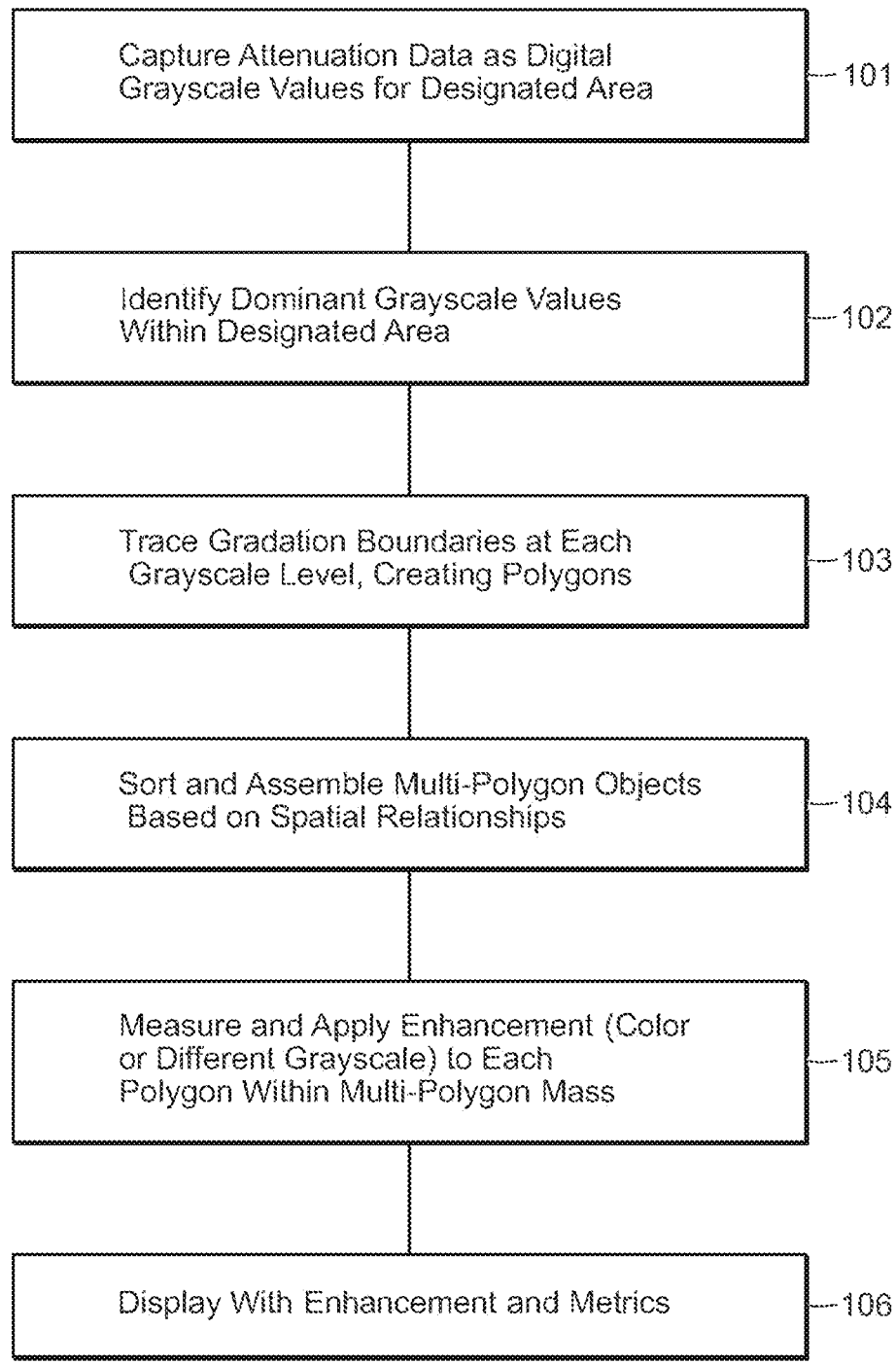
FIG. 2 is a flow chart that overviews a process according to the invention for image analysis.

FIG. 2 is an overview of a method of the invention for image analysis and/or enhancement on a client device. The illustrated method captures the attenuation data within a designated area provided by a digital image acquisition device. (Step 101). The illustrated method initially executes image analysis by identifying the dominant grayscale values within a designated range within an area of the image or for the entire image, such as a full-sized mammogram. (102). Using an iterative process deployed by the functions of a computer, the illustrated method scans the designated area for gradation boundaries of the dominant grayscale ranges and traces those boundaries, drawing a contiguous line. As the best embodiment, the illustrated method uses the same iterative process at each grayscale range (4, 8, 16, 32, 64, 128, 256) applied to the same digital image or designated area of the digital image; this results initially in hundreds of thousands individual drawn polygons, drawn at various bit-levels, each of which was defined by linking adjacent pixels within the dominant grayscale range; this is done with and without closure functions. (103). The illustrated method uses an iterative process deployed by the function of a computer to create an inventory of all polygons and eliminates duplicates formed at different bit-levels. Using the same iterative process the illustrated method sorts the polygons and assembles multi-polygon objects using individual polygons that share spatial relationships with each other. (104) The illustrated method measures the characteristics and size of the assembled multi-polygon object and applies enhancement to each of the constituent polygons, corresponding to the grayscale range derived from the original attenuation values assigned by the image acquisition device, thereby using enhancement to highlight the grayscale gradient that corresponds to tissue density. (105) The illustrated method displays the enhanced multi-polygon object as a digital representation of a tissue mass and provides metrics of the number of polygon layers (AQ—attenuation quotient) of the mass as well as its estimated diameter, area and volume. (106). The multi-polygon "mass" can be displayed with or without the surrounding background to enhance visual analysis and can be saved to a morphological database where other multi-polygon objects are stored, allowing for searching and comparison with other multi-polygon tissue masses.

Capturing Attenuation Values

Figure 3:
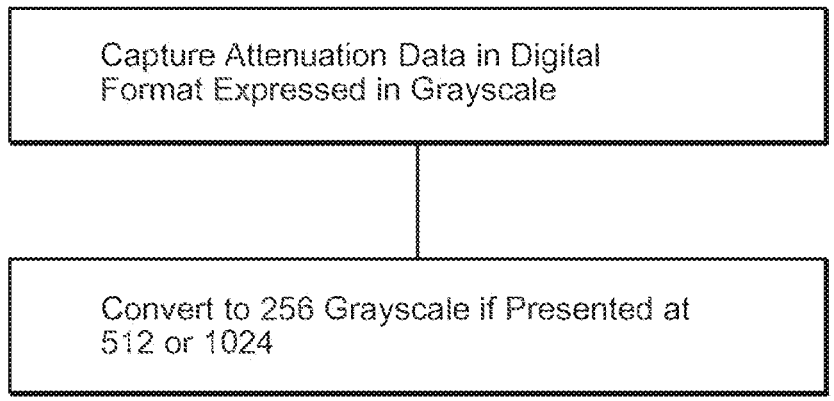
FIG. 3 is a flow chart depicting the capture of attenuation values in a system according to the invention.

Referring to FIG. 3, systems and methods according to the invention (hereinafter, collectively, "systems" or "methods," unless otherwise evident from context) capture the digital grayscale values based on the attenuation data recorded by the radiographic image acquisition machine i.e. a mammography x-ray machine, both 2D and 3D. The data is presented in digital format that can currently range to a grayscale as high as 1024 shades of gray. The systems convert the grayscale values to 256, which has been deemed the best mode for processing digital mammography images; however, the systems utilize grayscales ranges as low as 4 and can is able to process to the upper end 1024 grayscale as currently defined. For the purpose of mammography, the acquisition image has been processed to conform with DICOM format requirements. The systems, however, can translate any digital image format, i.e. jpeg, gif, png, bmp and any other digitized format.

Identify Dominant Grayscale Ranges Sequential Groupings (GRSGs)

Figure 4:
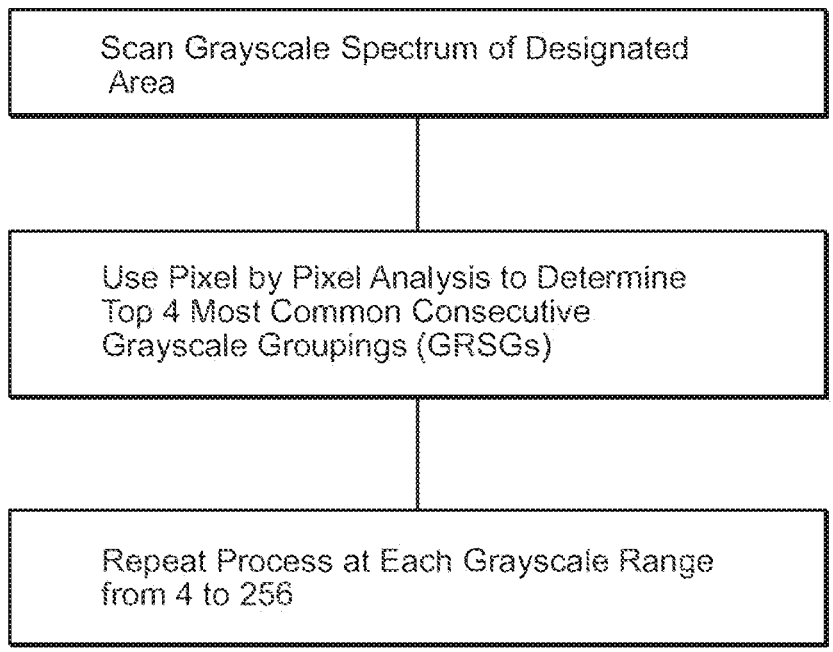
FIG. 4 is a flow chart depicting the identification of dominant grayscale ranges sequential groupings in a system according to the invention.

Referring to FIG. 4, systems according to the invention scan the grayscale spectrum of a designated area of the image or the entire image if designated for analysis, such as a full-scale mammogram. Using a pixel by pixel analysis the systems determine the top four most common consecutive grayscale range sequential groupings (GRSGs) that are being used in the designated area. (102:1) This iterative process can also be used to determine the top 3 common GRSGs or it can be used to identify more than 4 GRSGs. A preferred mode of use for digital mammography is to use 4 GRSGs and do the image analysis of a designated area at each grayscale range from 4 to 256. For analysis of images at larger grayscales (512 or greater) a larger number of GRSGs could be identified, reflecting greater granularity.

Create and Sort Polygons Contouring Tissue Density Gradient

Figure 5:
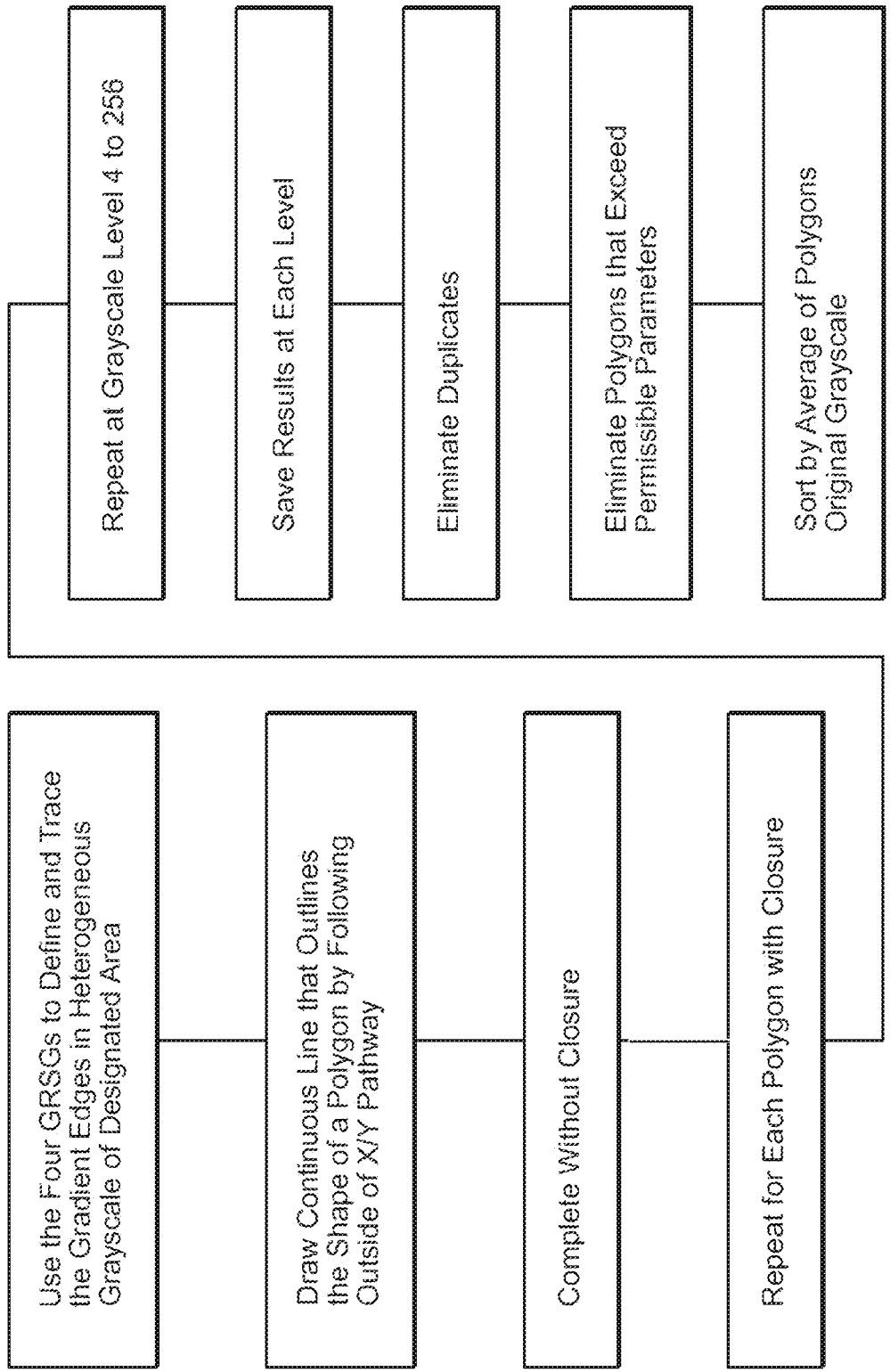
FIG. 5 is a flow chart depicting the creation and sorting of polygons and contouring of tissue density gradient in a system according to the invention.

Referring to FIG. 5, using an iterative process deployed by the functions of a computer, the systems according to the invention use the four GRSGs to define and trace the gradient edges of the grayscale in the designated area, forming a continuous line that outlines the shape of a polygon. This is done by using an iterative function of a computer to link adjacent pixels to the pathway of an emerging polygon by following the value range of a GRSG as it defines the outside x/y pathway. Optionally, edge detection can be used to define a polygon instead of GRSG method defined above.

The systems create polygons without using closure and save the result. The systems then applies closure to the resulting polygon's outside boundary by tracing it to correct potential x/y pathway anomalies, thereby closing gaps in pixel runs that are less than 0.09 percent smaller of either the width or height; if that results in a value of less than 20 pixels then 20 pixels is used. The process of the inventive systems referenced here represent current best mode for mammography—other cut off values could be applied when performing closure.

Methods according to the invention use an iterative process, defining a GRSG for each level of grayscale and then traces the polygons at those levels—4, 8, 16, 32, 64, 128, 256. The methods use closure as above and then saves the results, creating as many has several hundred thousand individual polygons.

Using an iterative process deployed by a computer, the methods sort the numerous polygons initially created, eliminating: 1) duplicates generated at different grayscale levels and by closure; 2) polygons that assume shapes beyond permissible parameters set by ratios that define anomalous polygon forms that could not represent targeted tissue masses i.e. breast implants, implanted devices, physical barriers such as the edge of the mammogram, or known artifacts of compression in mammograms. The methods sequentially sorts the polygons by the average of its original grayscale values and orders it by size, beginning with the smallest, when the grayscale value are the same.

Assemble Spatially Related Polygons; Reflecting Tissue Morphology

Figure 6:
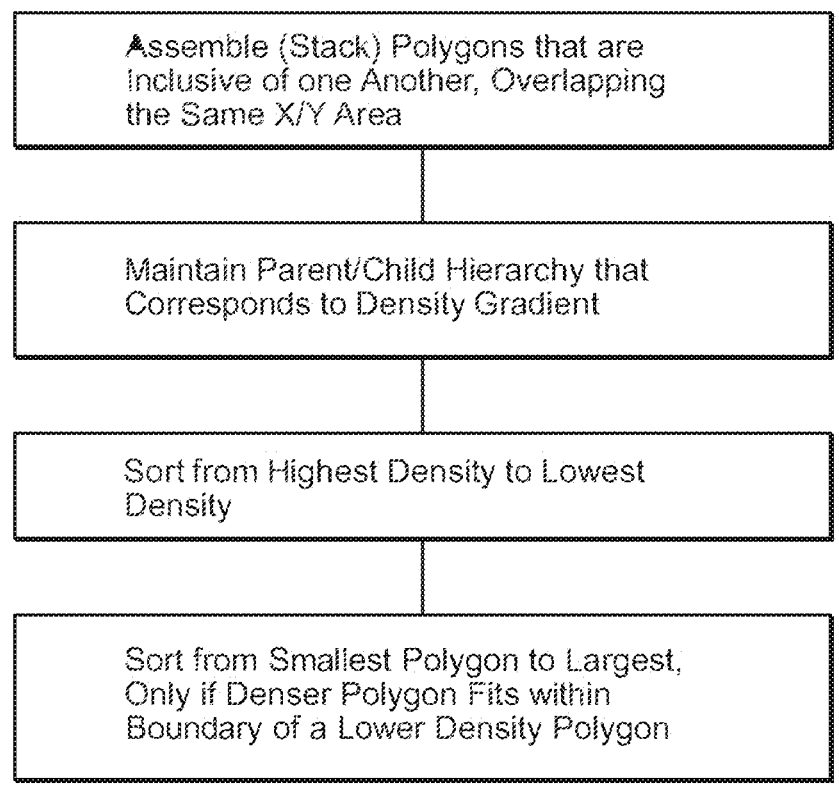
FIG. 6 is a flow chart depicting the assembly of spatially related polygons reflecting tissue morphology in a system according to the invention.

Referring to FIG. 6, systems according to the invention use an iterative process deployed by a computer, e.g., 14-18, to assemble polygons into multi-polygon objects that reflect the tissue morphology of masses contained in the designated area i.e. an area of defined by visualization window or the entire mammogram. Using an iterative function of a computer, the systems assemble ("stacks") the polygons that are inclusive of one another, overlapping the same x/y area. The systems do the ordering based on a "child—parent" relationship that orders the layering of the polygons based on a hierarchy that corresponds with density gradients. The polygons registering the highest density fall in the center of the mass—reflecting the fact that malignant masses typically have dense cores and malignant tissue radiates out from such cores with decreasing density. The systems use an iterative process deployed by a computer to assemble these polygons from high density to low density and smallest to largest—assuring that a denser polygon must fit within the boundaries of a lower density polygon. This can result in a lower density polygon having several higher density polygons located within it—reflecting the complexity of tissue morphology.

Rating, Measuring, Enhancing and Displaying Assembled Polygons

Figure 7:
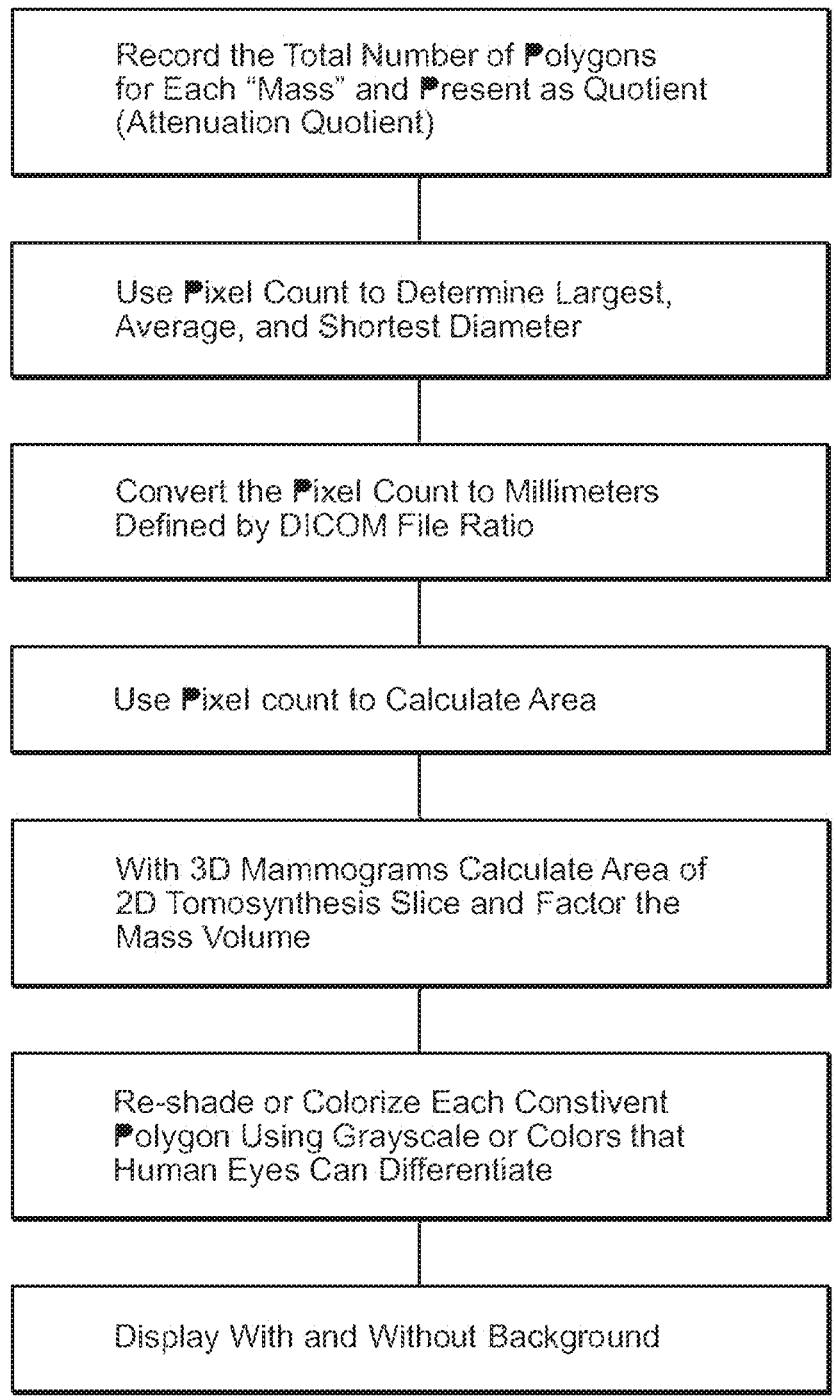
FIG. 7 is a flow chart depicting the rating, measuring, enhancing and displaying of assembled polygons in a system according to the invention.

Referring to FIG. 7, using an iterative process with a computer, e.g., 14-18, systems according to the invention records the total number of polygons that make up a completed "mass" and presents that as a rating value called "Attenuation Quotient" (AQ). In the case of a multi-variant polygon (with denser polygons inside less dense polygons), the AQ displayed is of the densest polygon stack.

The systems use a computer to measures using pixel count the largest diameter, the average diameter and shortest diameter and converts those measurements to image acquisition millimeters/centimeters as defined in the DICOM file or other standardization data. Using similar pixel count processing, the invention calculates the area of the largest polygon of the mass. In the case of 3D images, the area of the mass as seen as in the consecutive tomosynthesis slices is factored by the computer, taking into consideration the known distance between slices, in order to calculate the volume.

The systems re-shade or colorize (depending on the capacity of the display monitor in use) each polygon using grayscale ranges and/or colors that the human eye can differentiate. The multi-polygon "mass" can be displayed with or without the surrounding background to enhance visual analysis.

Creating Searchable Criteria for Polygons Saved as Morphologically Relevant

Figure 8:
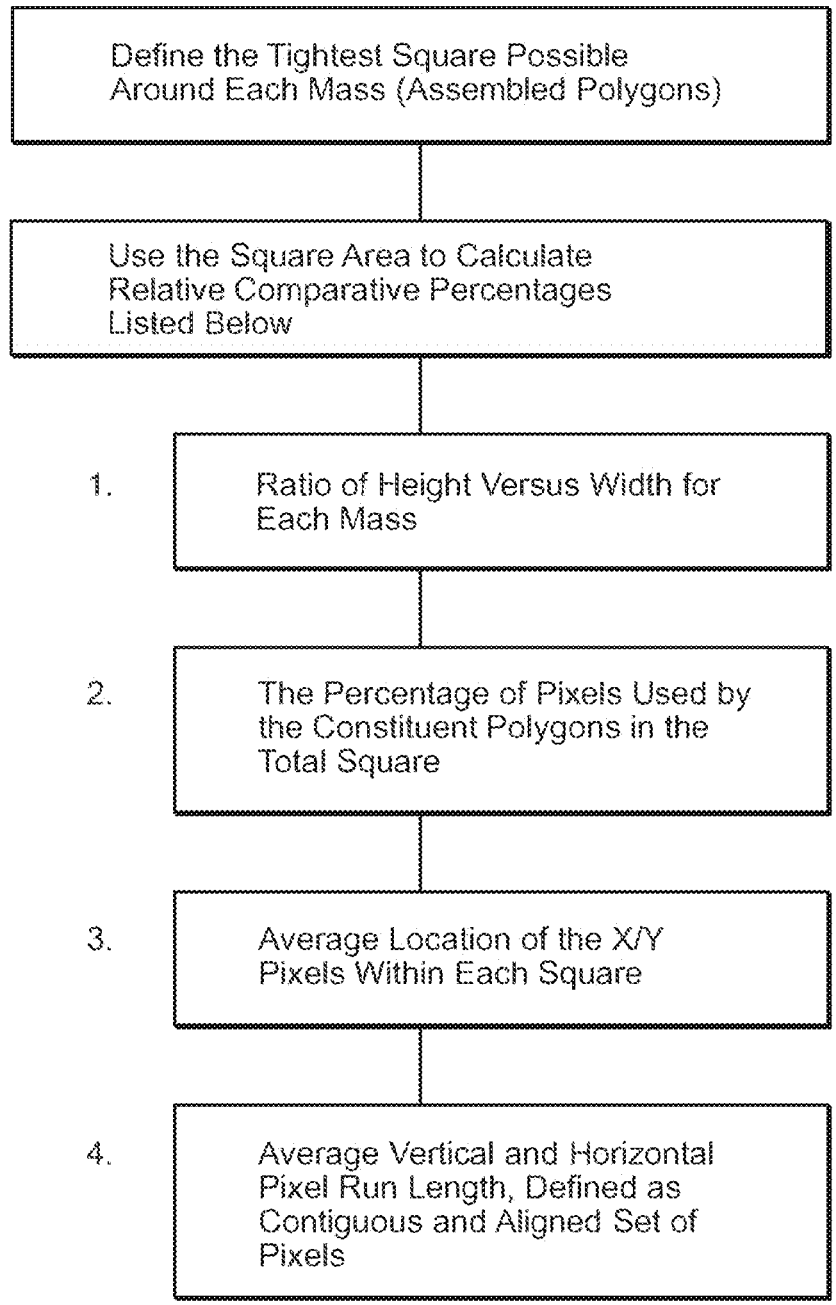
FIG. 8 is a flow chart depicting the creation of searchable criteria for polygons saved as morphologically relevant in a system according to the invention.

Referring to FIG. 8, the criteria for searching both 2d and 3d masses is based on the comparison of all the constituent polygons of a targeted mass. This comparison is done in through a set of percentages to allow for similar morphological masses to be compare even when their relative size is different. To make these percentage-based criteria, the invention uses a computer to define the tightest square possible around each mass (assembled polygon(s)) and uses that square area to calculate the relative comparative percentage. The following comparative percentage are calculated based 1) A ratio of height versus width for each mass expressed in a range from 1 to 200 percent.
2) The percentage of pixels used by the polygon in the total square
3) The average location of the x and y pixels within the each square—defining the relative positioning
4) The average vertical and horizontal pixel run length, where a run length is defined as a contiguous and aligned set of pixels running either horizontal or vertical but not diagonal.

Using a computer to execute the above calculations allows for searching for and comparisons among other multi-polygon tissue masses held in a database despite differences in relative size and the variance of minor morphological characteristics.

Advantages

Prior art 3D mammography imaging machines capture extremely slight differences in attenuation—distinctions when converted to grayscale imaging that are beyond the range of human vision. Systems according invention overcomes this problem by capturing the attenuation values to be assigned each pixel, thereby calculating various gradients in the visible and invisible range, then using those gradients to trace the polygons that reflect contours of the mass. Such systems then re-assemble the spatially-related polygons into a morphological whole and colorize each gradation layer to distinguish the constituent gradations thereby revealing the morphological details once hidden. In addition, because systems according to the invention can isolate the contours of the tumor at the attenuation value level, other innovative computations are possible. For example, the systems can use the attenuation value data to calculate the size and shape of the tumor in each of the 2D slices that tomosynthesis imaging uses to render a composite "3D image." As a result, systems according to the invention can calculate the volume of a mass in a mammogram—a key metric when considering treatment options for breast cancer.

Prior art provides computer-aided imaging solutions have been applied to mammography, known as Computer Assisted Diagnosis. Such systems commonly used rules-based pattern recognition to identify areas on a mammogram that could contain a malignant mass. CAD systems mark areas of suspicion on the mammogram with an X or some other graphical designation. However, a 2015 mega-study concluded that CAD did not improve breast cancer detection and today CAD is no longer eligible for reimbursement and has largely been abandoned by radiologists. Renewed hope for computer-aided detection in mammography has come with the emergence of various machine learning applications. Like CAD these systems are attempting to identify areas of suspicion. In addition, these new Machine Learning/AI systems purport not only to mark an area of suspicion but produce scores rating the probability of malignancy. Machine Learning/AI applications produce results derived through pattern analysis and recognition within the black & white digital image; the systems "train" the software on known malignant masses and then use evolving algorithms to match similar black and white patterns that appear in the target mammogram; the more similar the pattern, the higher the malignancy score. As the software trains on more and more images, it is expected to improve its pattern recognition and related scoring.

Systems according to the invention are distinct from prior art pattern-recognition systems. Those according to the invention do not train on a set of curated mammograms with known malignant masses and does not mark an area as suspicious and offer a predictive quantification based on pattern recognition. As described herein, systems according to the invention reveal underlying morphology through the processing of attenuation values captured by the digital image acquisition device and recorded in a digital image such as a mammogram. Further, systems according to the invention displays the results through visualization by utilizing colorization defined by pixel gradation contouring calculated uniquely on each targeted image. The metrics—number of layers, diameter, area and volume of the revealed mass—are directly computed from the contouring of density gradation embodied in the target image and not the result of pattern recognition or the use of the trained datasets of machine learning.

EXAMPLE

Described below are operations of the client devices 14-18 and server 12 in an exemplary system according to the invention that provides for pop-up display of the results of image analysis according to the invention. The programming of such devices 12-18 for such purpose is within the ken of those skilled in the art in view of the discussions below and elsewhere herein.

Figure 9:
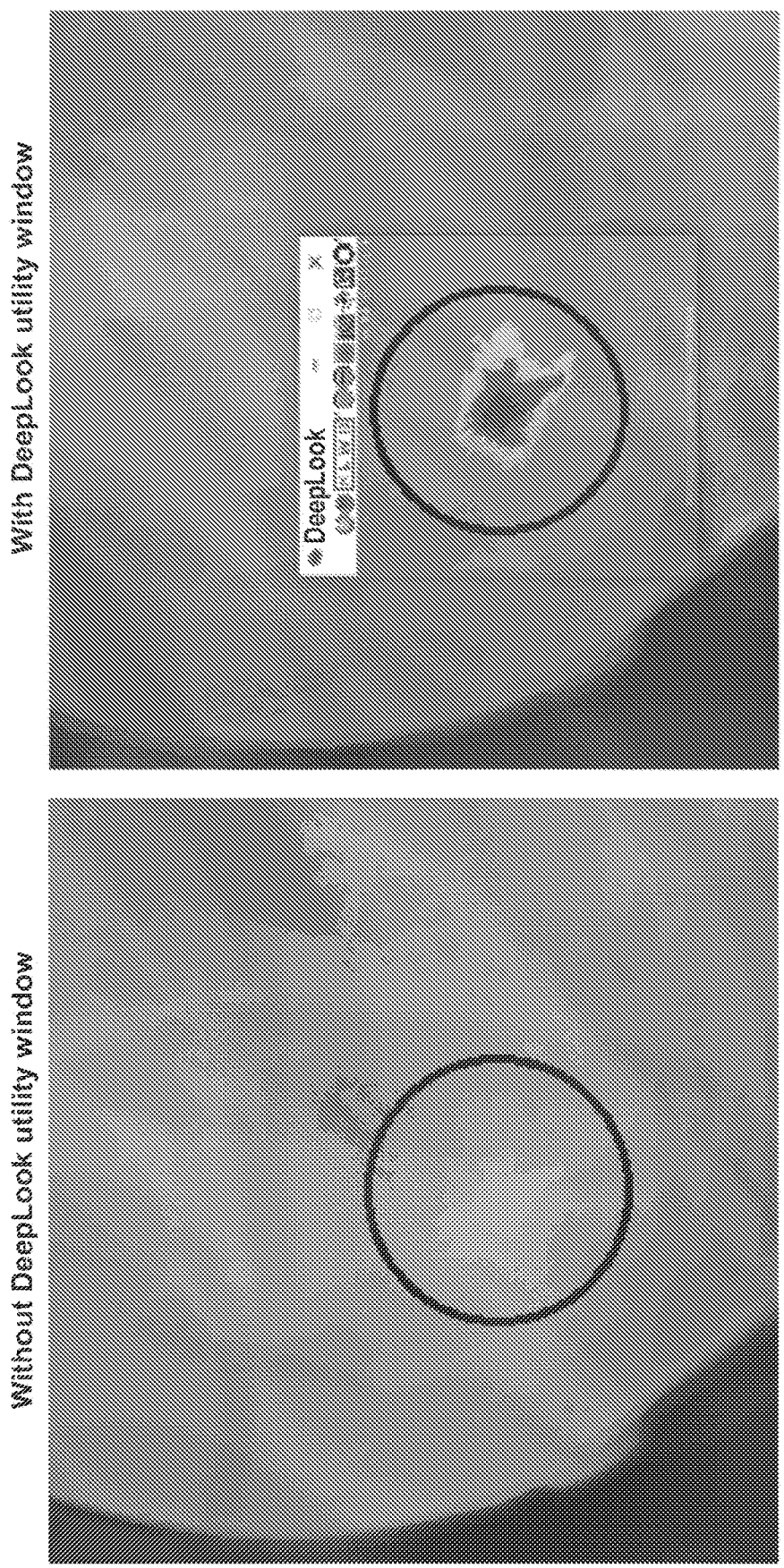
FIG. 9 depicts a radiological scan without and with a pop-up utility window for image enhancement according to the invention.

1. This example describes a utility that is used in systems according to the invention to view radiologic images in a poop window—referred to below as the "DeepLook window." The pop-up utility works directly on the display of medical monitors and/or other digital displays used to view, evaluate and/or compare radiologic images. It performs a screen grab of the current monitor Pixel Gradation Mass (PGM) pixel settings and analyzes them. The image in FIG. 9 shows a mammogram with and without the DeepLook window.

2. The technology supporting the pop-up window analyzes pixel gradation directly from the digital screen. It analyzes the image displayed regardless of the modality used to acquire the image. The software works on any medical image presented in grayscale or color, including but not limited to mammography and ultrasound.

3. The software groups pixels deemed similar in brightness on a continuum of the grayscale (color pixels are converted to a corresponding grayscale). DeepLook converts them into a single grayscale value—thereby creating areas of contiguousness. As shown in FIG. 10 contiguous grouping at a single grayscale value reveals outlined shapes called Growth Rings (GR).

4. The grouping method that creates Growth Rings (GR) establishes ordering according to relative brightness. In radiology (x-rays), MRI, MBI and other technologies, the ordering is done in descending steps from white to black; in ultrasound the ordering occurs in ascending steps from black to white. This ordering method creates overlapping GRs; they are recursive and display as shapes within shapes, according to each GR's grouped grayscale value.

5. This grouping, ordering (descending or ascending) and recursive overlapping effectively displays outward growth from one or more points to a final outward shape called a Pixel Gradation Mass (PGM). Note: a mass may have several growth points that converge as they grow outward.

6. In FIG. 11, the image on the left is a conceptual Pixel Gradation Mass (PGM). On the right of FIG. 11 is a PGM as displayed in a mammogram with converging outward growth points.

7. The technology supporting the pop-up window initially differentiates grayscale at the single pixel level—gradation beyond the range of normal human vision. It then highlights with color the constituent Growth Rings (GRs) created by pixel shade grouping described above in items #3 and #4. These GRs are invisible or not readily visible to the human eye. The software applies colorization to highlight and distinguish GRs within the Pixel Gradation Mass (PGM).

8. FIG. 12 is a graphical illustration of concentric rings representing the Growth Rings seen in a mass on a mammogram. On the left of FIG. 12, the box contains concentric rings representing the growth rings of an organic mass. The space may appear nearly blank but is not. The concentric rings are there but the grayscale distinction between each ring is effectively impossible to see. On the right side of the box in FIG. 4 is exactly the same image enhanced by the software technology; it delineates the rings by highlighting with scaled color.

9. Unlike the graphical illustration above, growth rings derived from radiological images of organic tissue are irregular in shape and not cleanly delineated. Below, the technology is applied directly to a 2D mammogram. In FIG. 13, the image on the left is a bright white area on the mammogram; this is typically indicative of a possible mass but the features are hard to discern because of the uniform whiteness. On the right of FIG. 13 is the identical bright white area as viewed with the pop-up utility. Organic concentric pixel shading is visible, as the technology of the pop-up utility displays a Pixel Gradation Mass (PGM) with over 12 Growth Rings (GRs).
10. The technology and methods behind the pop-up utility uses a set of ratios, weighted averaging techniques and other calculations to establish the dimensions of a Pixel Gradation Mass (PGM). The PGM's contour and size result from the total number of Growth Rings (GRs) created by pixel gradation analysis (items #3-6 above); and the gradation occurs in ascending or descending ordering depending on the mode of image acquisition (radiology, ultrasound, etc.). The number of Growth Rings identified and delineated define the contours and size of the PGM. See FIG. 14.
11. The technology and methods behind the pop-up utility provide an overall density value expressed on a scale of 0-10 to inform the user and assist in comparisons and analysis. The density rating of the Pixel Gradation Mass (PGM) is determined by calculating the average area of increase as the Growth Rings radiate out from the center.

Figure 15:
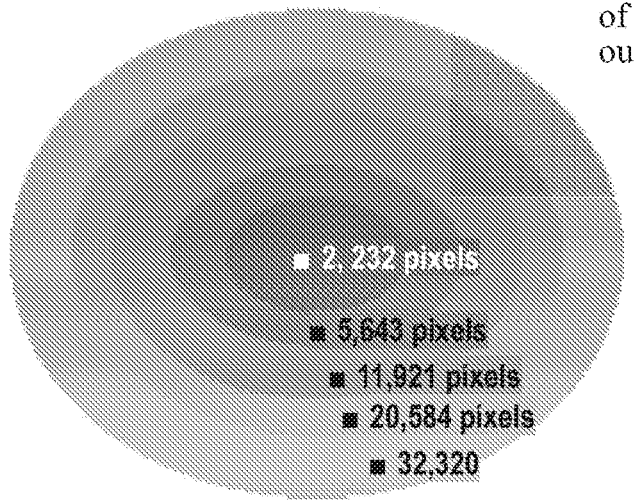
FIG. 15 illustrates that the density of a mass is determined by calculating the average area of increase as GRs extend outward in a system according to the invention.

Density defined: Density of a mass is determined by calculating the average area of increase as GRs extend outward. The density rating is normalized from 0 to 10 against all other mapped masses. The illustration in FIG. 15 has density of 7.5.

12. The technology and methods behind the pop-up utility provide an overall measure of "whiteness" (or "darkness" for ultrasound and similar modalities) which corresponds to density in radiological images. The value of whiteness (or darkness) is expressed on a scale of 0-10 to inform the user and assist in comparisons and analysis. Whiteness of a Pixel Gradation Mass (PGM) is determined by the density rating of core layers within a PGM.

Figure 16:
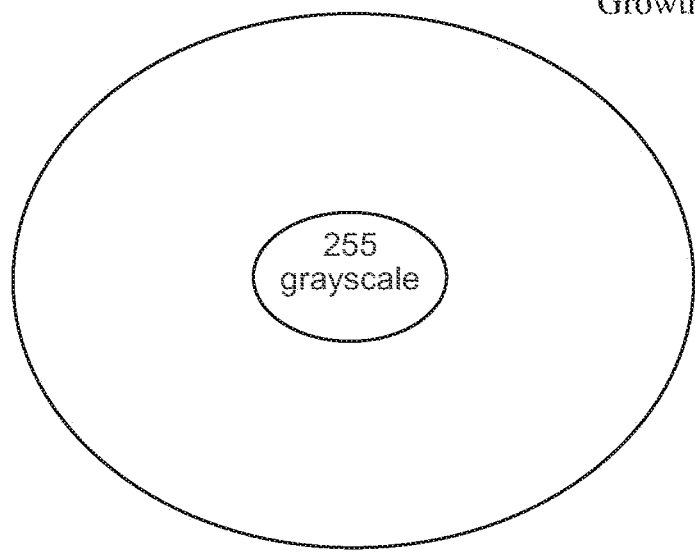
FIG. 16 illustrates that whiteness of a PGM is determined by brightness of the center GRs in a system according to the invention.

Whiteness defined: Whiteness of a PGM is determined by brightness of the center Growth Ring(s) (GR). Whiteness is normalized from 0 to 10 against all other mapped masses within the area defined by outlines of the pop-up utility. It is possible to expand or contract the size of the window, resulting in a new comparative calculation. The illustration in FIG. 16 has a whiteness of 10.0 on a grayscale of 0-256.

Figure 17:
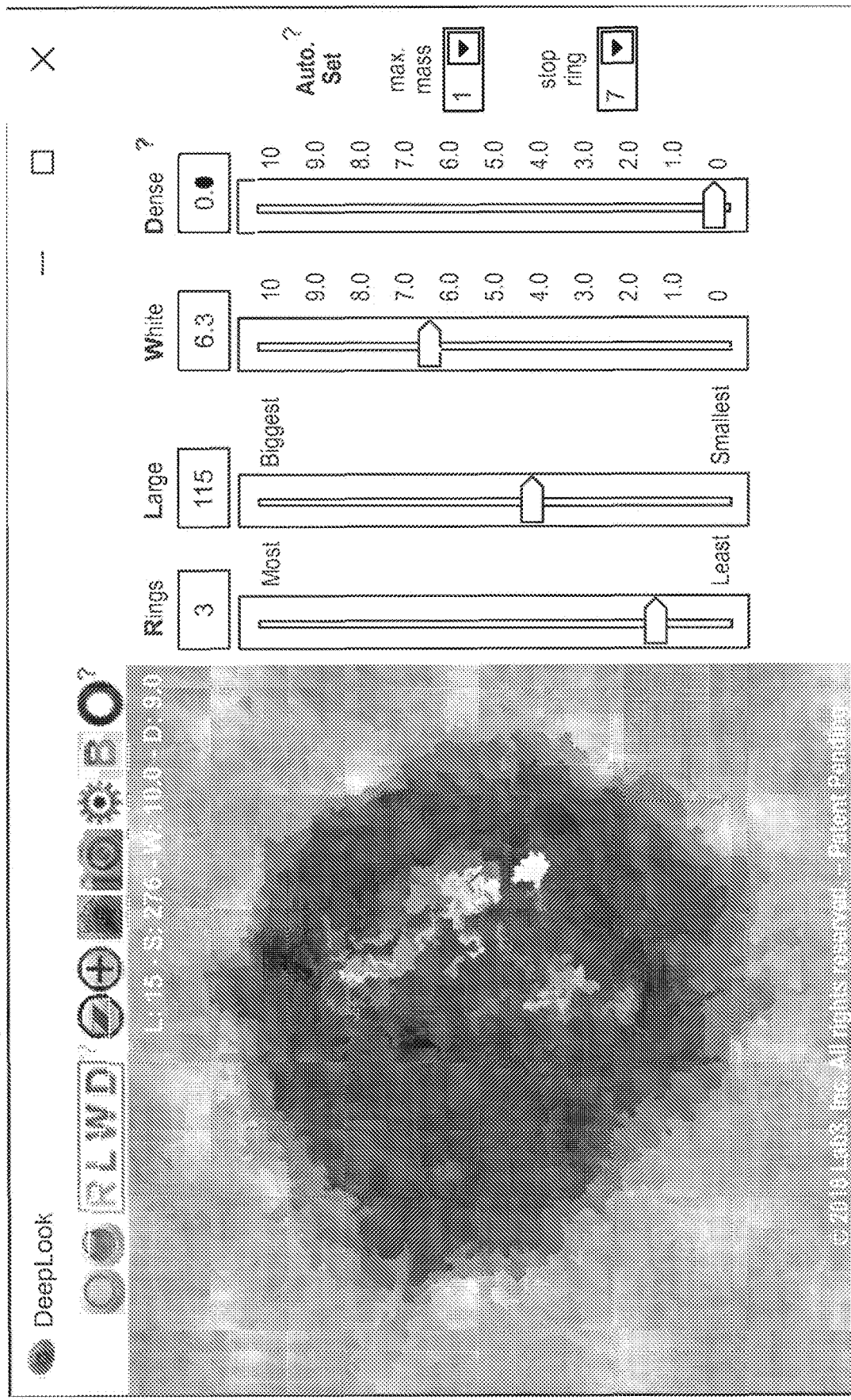
FIG. 17 illustrates the modification of pop-up utility window settings in a system according to the invention.

13. The default setting of the pop-up utility displays the Pixel Gradation Mass (PGM) having the most Growth Rings (GRs) within the range of the perimeter of the pop-up window. The default settings can be modified by the user to expand or reduce the number of masses highlighted in the window and the minimum number of GRs a mass must have to be displayed by drop-down menus in the setting window. Additionally, the window display can be filtered manually by adjusting any of four inter-related variables below. The variables are actuated by clicking the settings icon on the pop-up utility menu bar found along the top of the window. As illustrated in FIG. 17, the following are the four variables:

R=the number of Growth Rings (GRs).
L=the size of the outermost GR in relation to the other Pixel Gradation Masses (PGM) being analyzed in the same popup window. 1=smallest, N=largest −1 to N.
W=the PGM's highest grayscale-grouped GR value (for x-rays), or lowest grayscale value (for ultrasound).
D=the PGM density as described in item #11 above.

14. The technology and methods behind the pop-up utility create a unique set of numerical values associated with each Pixel Gradation Mass (PGM) that taken together create an electronic "profile" of the mass. The electronic profile—called a Mass Tissue Profile (MTP)—can be used to execute specialized visual-based searches in a custom MTP database, revealing matches and correlations of other MTPs derived from additional medical images.

Pseudo-Code

Following is the pseudo-code for creating the Pixel Gradation Mass (PGM) and other capabilities outlined above:

1. Move the pop-up window over the screen area to be analyzed. Alternatively, analysis can be of a specific area of an image from a data file such as *.jpg, *.gif, DICOM, *.PNG, *.TIFF, etc.
2. Do a "screen grab" of the current monitor's pixels. Alternatively, an image file of any type such as *.jpg, *.gif, DICOM, *.PNG, *.TIFF, etc. converted to a pixel display similar to a "screen grab" can be used.
3. Locate the area directly under the pop-up window display—or alternatively, select the area from an image file converted to a pixel display. Copy those pixels in the selected file to a standalone file; alternatively, work from the grabbed pixel memory using selected area offsets, or similar methods for reading and managing the pixel information.
4. Search the selected area for contiguous pixel groups—making a list sorted by brightness. Below are the steps used in the DeepLook pop-up window to create contiguous pixel groups. A contiguous pixel group is a group of pixels having the same shade, or similar shading, that are touching ("contiguous"). Alternatively, any other method that generates contiguous pixel groups can be used.

DeepLook pseudo-code used to "generate continuous pixel" groups:
   A. Create an array of integers having one grayscale value for each pixel for all the pixels "screen grabbed". The maximum grayscale value is variable. In the DeepLook implementation, the maximum grayscale value is 255. Starting with the top-upper-right pixel, working left-to-right and top-down in the selected area, value create a single integer value for each pixel representing its assigned grayscale value. If Red=Green=Blue, the value would be the current Red value. If Red, Green or Blue are not all the same, then use a color-to-grayscale pixel formula to convert the pixel value to grayscale. This implementation uses "luma=red*0.3+green*0.59+blue*0.11." Alternatively, any formula or algorithm can be used to create a single value from the three RGB values of the pixel, if not a grayscale pixel representation.

B. Use the grayscale array as an X to Grab Width, and Y to Grab Height—as a rectangular representation of the grabbed area. Starting with the maximum number of possible shades of gray for the screen area, scan the array for contiguous pixel groupings. For each scan of the array, reduce the grayscale value of each array value by the power of 2 (bit shift right 1) until the maximum value is 3—which is a total of 4 possible shades of gray.

If the maximum grayscale value is 255 on the first scan through the array, the maximum value that any array element can have is 255. On the second run-through of the array, the maximum value would be 127; on the third, the value would be 63.

For each array scan, when a contiguous pixel group is found, then the parameters that define the group must be saved. The below parameters are kept in this implementation that are used later in this implementation. Alternatively, any additional parameters can be saved which may, or may not, be used at a later date. And of the below parameters based on the current implementation can be skipped.

1. X and Y pixel point path containing and outlining the continuous pixel group.
2. All continuous pixel groups are identified by the actual pixel rectangle surrounding the shape. The percentage of the pixel area that the shape covers in its pixel rectangle.
3. The average pixel X position of each pixel used in the shape in relation to its actual pixel rectangle.
4. The average pixel Y position of each pixel used in the shape in relation to its actual pixel rectangle.
5. The average run length of the continuous right-to-left pixel length that make up the shape.
6. The average run length of the continuous top-to-bottom pixel length that make of the shape.
7. The shape's width
8. The shape's height
9. The total XY point count of the XY point path (1 above)
10. The average grayscale pixel value of the shape.
11. The XY position of every pixel in every shape saved.

C. Run through list of saved shapes and remove duplicate shapes.

5. Using the shape data saved from 4(B) above, create a matrix table of shapes found. The table identifies where shapes intersect and/or overlap—and is used when creating concentric pixel gradation.

6. Search for concentric pixel gradation masses, creating a list of them. Searching for concentric pixel gradation is broken down into the following steps (alternatively, other alternative methods to search for concentric pixel gradation can be used):

A. Sort shape list with the brightest first, then largest.
B. Starting at the top of the list, for each shape on the list that has not been assigned to a mass already, perform step B.1 below:
B.1 Using the matrix table of shapes created in step 5 above, search the shape pixel rows and columns looking for shapes that completely surround it. If a shape is found that completely surrounds the current shape, and if any of the following are true, grab the next shape on the list:

1. Its average grayscale is greater then the current shape's average grayscale.
2. The absolute value of the found shape's grayscale minus the current grayscale shape is greater then N. In the implementation, N=6. Alternatively, any N value can be used.
3. The total area of the found shape is greater then N. In this implementation, N varies depending on the shape size. Smaller shapes have different settings then larger ones. See the attached code for specific definitions. Alternatively, this code can be implemented using other size constraints.
4. Shape width and height ratio do not match within a specific range of N. N varies in this implementation depending on the shape size. Smaller sizes have different settings then larger ones. See the attached code for specific defines. Alternatively, this code can be implemented using other size constraints.

C. If here, then the found shape is now considered a ring of the current shape. If the current shape is from the "B" list above, the current shape is saved as a mass. The found shape now becomes the current shape—and then proceed to B.1. The current concentric pixel gradation mass is considered complete once there are no other shapes surrounding the current shape that are not excluded by B.1.

7. If here, now have a list of all concentric pixel gradation masses found. Search for pixel gradation masses matching the current filter settings.

A. Scan the concentric pixel gradation masses list for masses that meet the current filter specification.
B. Using the X Y Path defined 4.B above, draw each massed found, using a different color range for each shape found in the masses. Optionally, display saved parameters in 4.B above and or the averaging of the shapes found in the mass. Alternatively, only selected shapes from the identified masses can be displayed.

A more complete understanding of the operations effected by the pseudo-code above may be attained by reference to incorporated-by-reference provisional patent application 62/678,644 and, specifically, the source code provided therein under the heading "DeepLook Source Code," which source code is explicitly incorporated by reference herein, which source code is reprinted in the incorporated-by-reference ASCII file named SoftwareAppendix1-ASCII.txt, filed herewith.

Radiomics—Spiculation Quantification/Characterization

Figure 18:
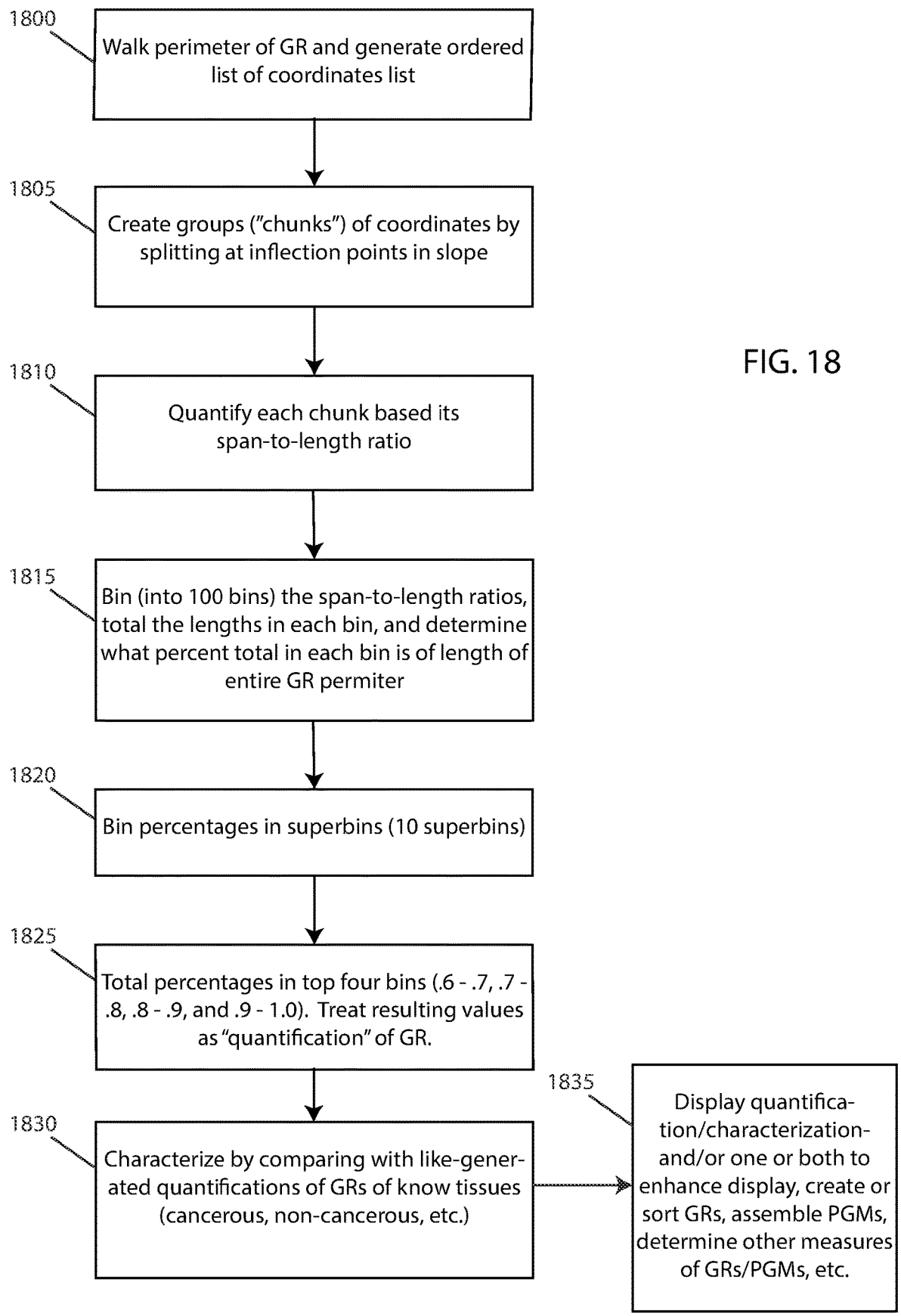
FIG. 18 depicts a method for growth ring spiculation quantification and characterization according to the invention.

Referring to FIG. 18, system 10 and more particularly, for example, one or more of the client and/or server devices 12-18 can quantify or otherwise characterize (collectively, hereinafter, "characterize") the spiculation of a growth ring and/or, thereby, a series of concentric such rings of which that growth ring forms a part (such series of rings referred to as a pixel gradation mass or PGM in the text that follows without loss of specificity or generality) as indicative, for example, of a potentially cancerous, non-cancerous (e.g., naturally-dense), or other mass. The programming of system 10 and, more particularly, devices 12-18 for practice of the method of FIG. 18 is within the ken of those skilled in the art in view of the teachings hereof.

In step 1800, the illustrated method walks the perimeter of a growth ring being characterized, e.g., the growth ring labelled "5" in FIG. 14, by way of non-limiting example, and generates an ordered list of coordinates defining that perimeter. The walk can be in a clockwise or counterclockwise direction, though, it is preferably consistent over the entire perimeter of the growth ring being characterized. Walking a growth ring perimeter is within the ken of those skilled in the art in view of the teachings hereof.

In step 1805, the illustrated method splits the list of coordinates generated in step 1800 into groups (of "chunks") of coordinates. The splits are made so as to divide the list into chunks of coordinates on either side of each inflection point on the growth ring perimeter. As used here, an "inflection point" is a point on the growth ring at which the sign of the slope of the ring changes, e.g., from representing (i) increasing changes in the y-coordinate ($\Delta y$) over increasing changes in the x-coordinate ($\Delta x$) to increasing changes in y over decreasing changes in x or, more succinctly, from $+\Delta y/-\Delta x \rightarrow +\Delta y/-\Delta x$; or, to continue using that symbology, (ii)$+\Delta y/+\Delta x \rightarrow -\Delta y/-\Delta x$; or (iii)$+\Delta y/-\Delta x \rightarrow +\Delta y/-\Delta x$; or (iv)$+\Delta y/-\Delta x \rightarrow -\Delta y/-\Delta x$; or so forth, as is within the ken of those skilled in the art in view of the teachings hereof.

In step 1810, the illustrated method quantifies each chunk based on its span-to-length ratio. As used here, the "span" of a chunk refers to the distance on a cartesian coordinate system between the endpoints of the chunk or, more colloquially put, the distance "as the crow flies" between those endpoints. In the illustrated embodiment, that span or distance is measured in pixels, though, other embodiments may vary in this regard. The "length" of a chunk, on the other hand, is the sum of the distances measured moving successively from point to point along the path defined by the coordinates that make up the chunk. This, too, is measured in pixels in the illustrated embodiment though, again, other embodiments may vary in this regard.

As will be appreciated by those skilled in the art, a span-to-length ratio as so defined will be greater than zero and less than or equal to one, i.e., 1 span-to-length ratio>0, with chunks that define a straight segments having a span-to-length ratio=1 and chunks deviating from straight have lesser such ratios.

In step 1815, the illustrated method bins the chunks in accord with their respective span-to-length ratios and, then, for each bin (i) totals the lengths of the chunks in that bin and (ii) determines what percentage that total comprises of the entire perimeter of the growth ring being characterized. Though, other embodiments may vary in this regard, in the illustrated embodiment, the method employs 100 bins in step 1815, for collecting chunks having span-to-length ratios of 0-0.01, 0.01-0.02, 0.02-0.03, . . . , 0.10-0.11, 0.11-0.12, 0.12-0.13, . . . 0.97, 0.98, 0.99, 1.0, respectively, all by way of non-limiting example.

In step 1820, the illustrated method collects (i.e., bins) the percentages generated in step 1815 into superbins based on the span-to-length ratios of the bins with which those percentages had been associated in step 1815. The number of superbins of step 1820 is smaller than the number of bins (of step 1815) and, in the illustrated embodiment, is ten-fold smaller, though, other embodiments may vary in this regard. Moreover, in the illustrated embodiment, the superbins are associated with span-to-length ratios of 0-0.1, 0.1-0.2, 0.2-0.3, 0.3-0.4, 0.4-0.5, 0.5-0.6, 0.6-0.7, 0.7-0.8, 0.8-0.9, and 0.9-1.0, respectively, again, though other embodiments may vary in this regard. Continuing the above examples, in step 1820, the illustrated method can collect into the superbin for ratios of 0-0.1 the percentages in the bins 0-0.01, 0.01-0.02, 0.02-0.03, . . . , 0.09-0.1, of step 1815; into the superbin for ratios of 0.1-0.2 the percentages in the bins 0.10-0.11, 0.11-0.12, 0.12-0.13, . . . , 0.19-0.2, and so forth, all by way of non-limiting example. Of course, in some embodiments, the only collects respective percentages into the superbins used in step 1825, discussed below.

In step 1825, the illustrated method totals the percentages in each of at least selected superbins. Here, those are the superbins associated with the span-to-length ratios of 0.6-0.7, 0.7-0.8, 0.8-0.9 and 0.9-1.0, though other embodiments may vary in this regard, both in regard to the number of superbins used and the ratios represented thereby. Those percentages, which taken together "quantify" the growth ring being characterized, can each be maintained as separate variables (or other data structures) for purposes of storage, display and/or further processing, or they can be appended together to one another to form a single numerical value referred to as a spiculation "value." For example, if the percentages 15%, 5%, 10%, 3% are totaled in step 1825 for the superbins associated with the ratios 0.6-0.7, 0.7-0.8, 0.8-0.9 and 0.9-1.0, respectively, those percentages can be appended (padded to two-digit or other uniform format, as necessary) to form the spiculation value "15051003".

In step 1830, the illustrated method characterizes that growth ring based on the quantification of step 1825. It does this by comparing the percentage totals of each of the selected superbins (e.g., the bins associated with span-to-length ratios of 0.6-0.7, 0.7-0.8, 0.8-0.9 and 0.9-1.0) with corresponding totals generated in a like manner (e.g., through exercise of steps 1800-1825) for growth rings of tissues of known morphology, e.g., cancerous tissues, non-cancerous tissues, and so forth. Where the comparison is favorable, the growth ring is characterized as possibly being of that morphology. The comparison can be strict in the sense of requiring numerical identity between each compared percentage, or can be based on range, e.g., as where tissues of know morphology are associated with a range of values for each respective span-to-length ratio.

As reflected in step 1835, a spiculation quantification or characterization can be displayed along with the PGM of interest (or otherwise) and it can inform the re-shading, colorizing and/or other display enhancement of growth rings (or "polygons") and/or PGMs (or "multi-polygon masses") as discussed, for example, in connection with FIG. 7 such that, more particularly and by way of non-limiting example, the system 10 can vary the nature and/or degree of such enhancement as a function of such quantification or characterization, all as is within the ken of those skilled in the art in view of the teachings hereof.

By way of further non-limiting example, such system 10 can highlight in one color or color range a PGM having a growth ring whose spiculation is characteristic of potentially cancerous tissue and, in another color or color range, a PGM comprised of growth rings having spiculation characteristic of non-cancerous tissues.

Such a spiculation characterization can, instead or in addition, inform the creation and sorting of such growth rings (or polygons), e.g., as discussed above in connection with FIG. 5, and/or the assembly of PGMs (or multi-polygon objects), e.g., as discussed above in connection with FIG. 6, such that, more particularly and by way of non-limiting example, the system 10 can choose or, conversely, ignore a growth ring as an outer boundary of a PGM depending on the spiculation characterization of that growth ring.

By way of further non-limiting example, such system 10 can choose, among growth rings whose perimeters would otherwise form an outer boundary of a multi-polygon PGM, a growth ring (if any) whose spiculation characterization is most likely indicative of potentially cancerous tissue. Such a use of a spiculation characterization can affect not only enhancement and display of PGMs but also (i) their respective Attenuation Quotients and other measures (e.g., dimensions, density, whiteness/darkness, and so forth), e.g., as discussed above in connection with FIG. 7 and in connection with the section entitled "Example" and (ii) searching and comparison among masses, e.g., as discussed above in connection with FIG. 8, all by way of non-limiting example, and all as within the ken of those skilled in the art in view of the teachings hereof.

A more complete understanding of the method shown in FIG. 18 and discussed above in connection therewith may be attained by reference to incorporated-by-reference ASCII file marginSpiculationCode-ASCII.txt, filed herewith.

Radiomics—Normalized Pixel Density ("NPD")

Figure 19:
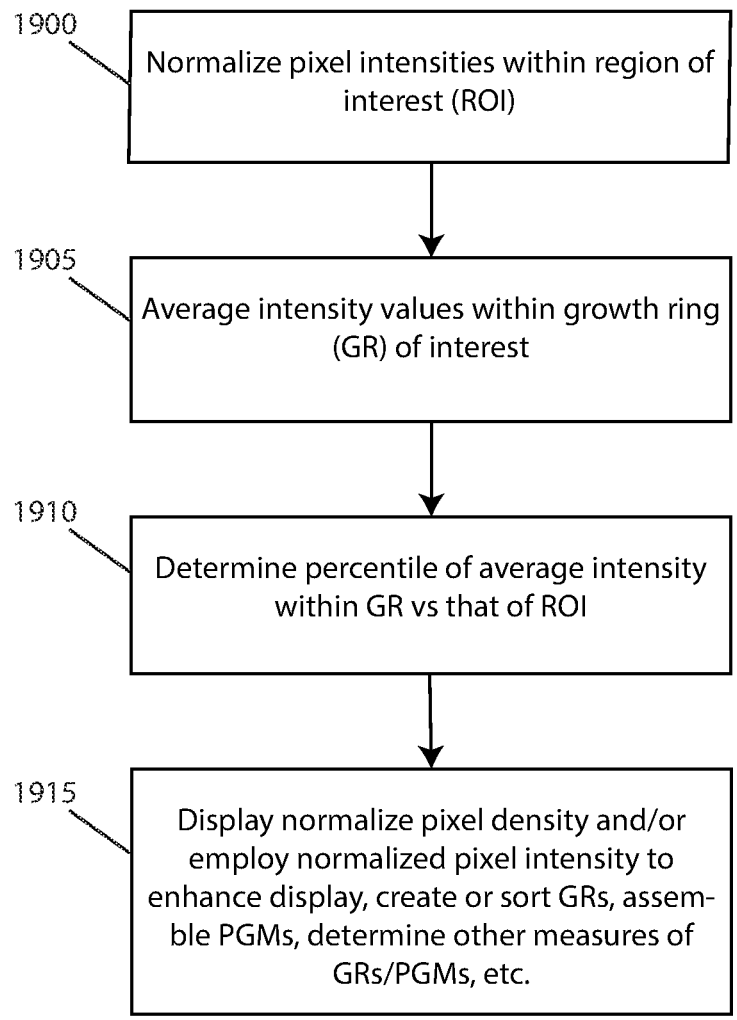
FIG. 19 depicts a method for normalized pixel density determination according to the invention.

Referring to FIG. 19, system 10 and more particularly, for example, one or more of the client and/or server devices 12-18 can also quantify a growth ring by determining its normalized pixel density (NPD), that is, by determining the percentile ranking of the average intensity of pixels within the growth ring relative to intensities of pixels in a region of interest of a radiological, ultrasound or other image. The programming of system 10 and, more particularly, devices 12-18 for practice of the method of FIG. 19 is within the ken of those skilled in the art in view of the teachings hereof.

In the embodiment shown in FIG. 19 and discussed below, it is assumed that the region of interest, if not the entire radiological, ultrasound or other image of which it forms a part, has been converted to grayscale. Other embodiments may perform such conversion prior to executing the method of FIG. 19. Still other embodiments may perform that method using, in lieu of the grayscale intensity values discussed below, intensity values that are computed directly from RGB or other pixel values contained in the region of interest or image of which it forms a part, all as is within the ken of those skilled in the art in view of the teachings hereof.

In step 1900, the illustrated method normalizes pixel intensities in a region of interest (sometimes referred to herein as a "bitmap") selected by the user. This can be the entire radiological, ultrasound or other image being processed, though, more typically, it is a region identified by the user by way of a mouse, touch screen or otherwise, as is within the ken of those skilled in the art in view of the teachings thereof. Alternatively or in addition, the region of interest/bitmap can be selected automatically (i.e., by operation of system 10) as part of the illustrated methodology, e.g., in connection with the determination of NPDs for all growth rings within a PGM or otherwise, again, as is within the ken of those skilled in the art in view of the teachings hereof.

Normalization of the pixel intensities within the bitmap is within the ken of those skilled in the art in view of the teachings hereof and can be performed, by way of non-limiting example, by (i) surveying the intensities of all pixels in the bitmap to identify the minimum and maximum intensity values, (ii) determining a scaling factor and offset that would extend those minimum and maximum values to range from 0-255 (or such other normalization targets as shall be used in implementation), and (iii) applying that factor and offset to the intensity values of the pixels in the ROI to normalize them. Other normalization techniques within the ken of those skilled in the art may be used instead or in addition.

In step 1905, the illustrated method determines the average intensity of pixels within a growth ring of interest (GROI) that falls at least partially, if not wholly, within the ROI. The GROI can be identified by the user by way of a mouse, touch screen or otherwise, as is within the ken of those skilled in the art in view of the teachings thereof. Alternatively or in addition, the GROI can be selected automatically (i.e., by operation of system 10) as part of the illustrated methodology, e.g., in connection with the determination of NPDs for all growth rings within the ROI, again, as is within the ken of those skilled in the art in view of the teachings hereof.

Determining the average intensity of pixel intensities within the GROI is within the ken of those skilled in the art in view of the teachings hereof and can be performed, by way of non-limiting example, by totaling the intensities of pixels in the GROI (following the normalization step 1900) and dividing that total by the count of those pixels. Other averaging techniques within the ken of those skilled in the art may be used instead or in addition.

In step 1910, the illustrated method determines the percentile ranking that the average determined in step 1905 is relative to normalized intensities of pixels in the ROI. Determining such a percentile ranking (a/k/a normalized pixel density or NPD) is within the ken of those skilled in the art in view of the teachings hereof and can be performed, by way of non-limiting example, by surveying the normalized intensities of all pixels in the bitmap and counting those having intensities (at or) below the average intensity determined in step 1905 in the case of x-ray and other imaging modalities in which "whiteness" is most intense or, conversely, those having intensities (at or) above the average intensity in the case of ultrasound and other modalities in which "darkness" is most intense. Other percentile ranking techniques within the ken of those skilled in the art may be used instead or in addition.

The NPD of a growth ring can, either alone or in conjunction with the spiculation quantification/characterization discussed in connection with FIG. 18, the relative centralized distance percent discussed in connection with FIG. 20, the balance determination discussed in connection with FIGS. 21-22, and/or the degree pleomorphism discussed in connection with FIG. 23, inform characterizing that growth ring or a PGM of which it forms a part as indicative, for example, of a potentially cancerous, non-cancerous (e.g., naturally-dense), or other mass, all as is within the ken of those skilled in the art in view of the teachings hereof.

Thus, for example, the illustrated method can compare the NPD of the growth ring with NPDs generated in a like manner (e.g., through exercise of steps 1900-1910) for growth rings of tissues of known morphology, e.g., cancerous tissues, non-cancerous tissues, and so forth. Where the comparison is favorable, the growth ring can be characterized as possibly being of that morphology. The comparison can be strict in the sense of requiring numerical identity between each compared value, or can be based on range, e.g., as where tissues of known morphology are associated with a range of NPD values.

As reflected in step 1915, an NPD determined as discussed above can be displayed along with the growth ring of interest (or otherwise) and it can inform the re-shading, colorizing and/or other display enhancement of growth rings (or "polygons") and/or PGMs (or "multi-polygon masses") as discussed, for example, in connection with FIG. 7 such that, more particularly and by way of non-limiting example, the system 10 can vary the nature and/or degree of such enhancement of a GR or PGM of which it forms a part as a function of the NPD of the GR, all as is within the ken of those skilled in the art in view of the teachings hereof.

By way of further non-limiting example, such system 10 can highlight in one color or color range a GR having a growth ring whose NPD falls in one numerical range and, in another color or color range, a GR whose NPD falls in another such range.

The NPD of a growth ring can, instead or in addition, inform its creation and/or the sorting of such growth rings (or polygons), e.g., as discussed above in connection with FIG. 5, and/or the assembly of PGMs (or multi-polygon objects), e.g., as discussed above in connection with FIG. 6, such that, more particularly and by way of non-limiting example, the system 10 can choose or, conversely, ignore growth rings as members of PGMs depending on the NPDs of those growth rings.

By way of further non-limiting example, such system 10 can employ NPDs to choose among growth rings whose perimeters would otherwise form an outer boundary of a multi-polygon PGM. Such a use of NPDs can affect not only enhancement and display of PGMs but also (i) their respective Attenuation Quotients and other measures (e.g., dimensions, density, whiteness/darkness, and so forth), e.g., as discussed above in connection with FIG. 7 and in connection with the section entitled "Example" and (ii) searching and comparison among masses, e.g., as discussed above in connection with FIG. 8, all by way of non-limiting example, and all as within the ken of those skilled in the art in view of the teachings hereof.

A more complete understanding of the method shown in FIG. 19 and discussed above in connection therewith may be attained by reference to incorporated-by-reference ASCII file NormalizedPixelDensity-ASCII.txt, filed herewith.

Radiomics—Relative Centralized Distance Percent (RCDP)

Figure 20:
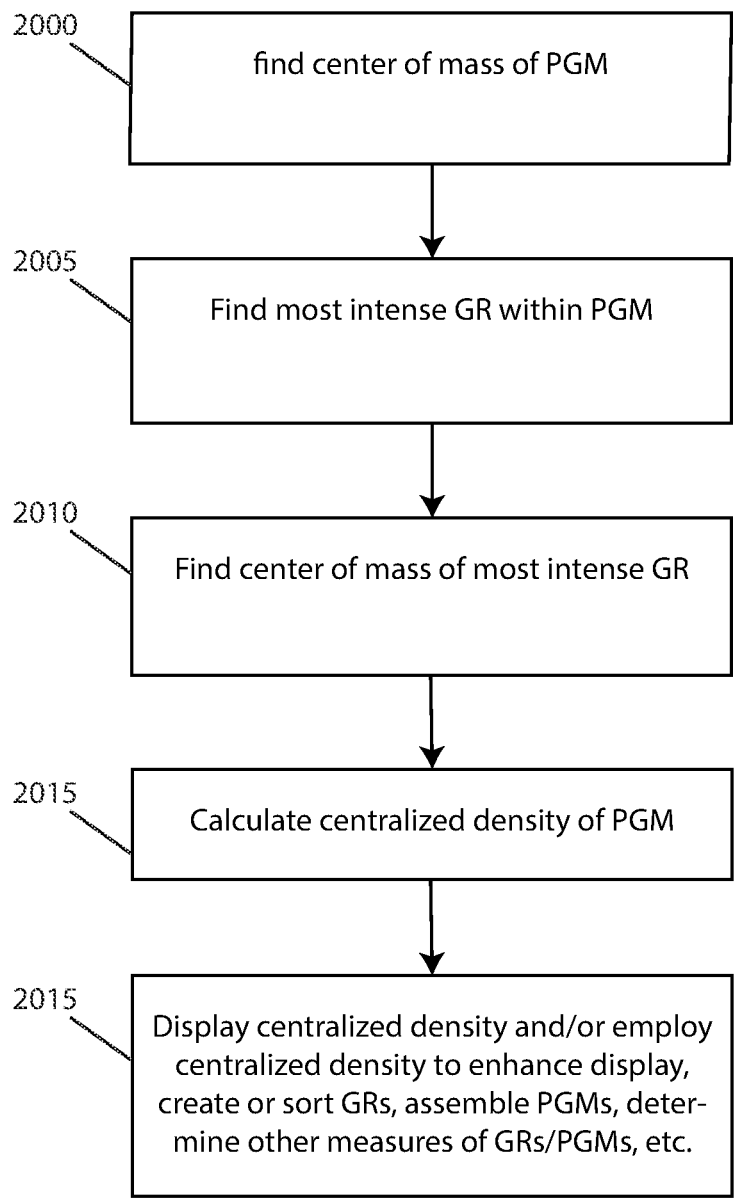
FIG. 20 depicts a method for relative centralized distance percent determination according to the invention.

Referring to FIG. 20, system 10 and more particularly, for example, one or more of the client and/or server devices 12-18 can quantify the relative centralized distance percent (RCDP) of a PGM of interest—i.e., the distance between the center of the PGM and the center of the most intense growth ring that makes it up, where that distance is normalized to facilitate comparison across different lesion/PGM sizes.

As used in this section without loss of specificity or generality, the terms pixel gradation mass and PGM refer to a series of concentric growth rings, e.g., of the type the assembly of which is discussed above, e.g., in connection with FIG. 6. The programming of system 10 and, more particularly, devices 12-18 for practice of the method of FIG. 20 is within the ken of those skilled in the art in view of the teachings hereof.

In the embodiment shown in FIG. 20 and discussed below, it is assumed that the PGM of interest, if not the entire radiological, ultrasound or other image of which it forms a part, has been converted to grayscale. Other embodiments may perform such conversion prior to executing the method of FIG. 20. Still other embodiments may perform that method using, in lieu of the grayscale intensity values discussed below, intensity values that are computed directly from RGB or other pixel values contained in the PGM of interest or image of which it forms a part, all as is within the ken of those skilled in the art in view of the teachings hereof.

In step 2000, the illustrated method determines the location of the center of mass of the PGM of interest, as well as the longest and shortest diameters of that PGM. This can be a PGM identified by the user by way of a mouse, touch screen or otherwise, as is within the ken of those skilled in the art in view of the teachings thereof. Alternatively or in addition, the PGM of interest can be selected automatically (i.e., by operation of system 10) as part of the illustrated methodology, e.g., in connection with the determination of centralized densities (RCDPs) of one or more PGMs identified and/or displayed by system 10, again, as is within the ken of those skilled in the art in view of the teachings hereof.

In the discussion below, the location of the center of mass of the PGM of interest is referred to as the Outside Margin Centralized Point (or OMCP). The longest diameter of that PGM is referred to as the Outside Margin Shape Longest Diameter (or OMSLD). The shortest diameter of that PGM is referred to as the Outside Margin Shape Shortest Diameter (or OMSSD).

Finding the center of mass of the PGM of interest is within the ken of those skilled in the art in view of the teachings hereof and can be performed by any of a number of techniques known in the art as adapted in accord with the teachings hereof. In the illustrated embodiment, the center of mass determination takes into account the intensities of all pixels lying within the outer boundary of the PGM (e.g., regardless of whether those pixels additionally lie within one or more other concentric growth rings making up that PGM), though, other embodiments may take into account only a subset of those pixels (e.g., those within user-selected inner concentric growth rings or otherwise).

Finding the longest and shortest diameters of the PGM of interest is within the ken of those skilled in the art in view of the teachings hereof and can be performed, by way of non-limiting example, by finding both the smallest circle that fits within the PGM and the largest circle that bounds the PGM. The diameter of the former defines the OMSSD, while that of the latter defines the OMSLD. It will be appreciate that other techniques within the ken of those skilled in the art as adapted in accord with the teachings hereof can be used determining the OMSSD and OMSLD can be used, instead or in addition.

In step 2005, the illustrated method identifies the most intense growth ring within the PGM of interest. For radiographic images or the like (i.e., medical images in which "whiteness" represents most intensity), this requires finding the growth ring within that PGM that has the highest (whitest) average pixel intensity; for ultrasound images or the like (i.e., medical images in which "darkness" represents most intensity), it requires finding that with the lowest (darkest) average intensity. Finding such a growth ring is within the ken of those skilled in the art in view of the teachings hereof.

In step 2010, the illustrated method finds the location of the center of mass of the growth ring identified in step 2005. Finding such a center of mass is within the ken of those skilled in the art in view of the teachings hereof and can be performed by any of a number of techniques known in the art as adapted in accord with the teachings hereof. In the mathematical relation, below, that location is referred to as the Densest Polygon Centralized Point (or DPCP).

In step 2015, the illustrated method calculates the relative centralized distance percent (RCDP) of the PGM on interest as a function of distance DP between the centers of mass found in steps 2000 and 2005, i.e., OMCP and DPCP, respectively, and as a function of the largest and smallest diameters of the PGM of interest, i.e., OMSLD and OMSSD. More particularly, it determines the RCDP in accord with the mathematical relation:

$$RCDP = DP/(OMSLD+OMSSD)$$

where, $$DP = OMCP - DPCP$$

Implementation and execution of such a mathematical relation in the context of the illustrated method is within the ken of those skilled in the art in view of the teachings hereof.

The RCDP of a PGM can, either alone or in conjunction with the spiculation quantification/characterization discussed in connection with FIG. 18, the normalized pixel density discussed in connection with FIG. 19, the balance determination discussed in connection with FIGS. 21-22, and/or the pleomorphism discussed in connection with FIG. 23, inform characterizing that PGM as indicative, for example, of a potentially cancerous, non-cancerous (e.g., naturally-dense), or other mass, all as is within the ken of those skilled in the art in view of the teachings hereof.

Thus, for example, the illustrated method can compare the RCDP of a PGM with RCDPs generated in a like manner (e.g., through exercise of steps 2000-2015) for PGMs of tissues of known morphology, e.g., cancerous tissues, non-cancerous tissues, and so forth. Where the comparison is favorable, the PGM of interest can be characterized as possibly being of that morphology. The comparison can be strict in the sense of requiring numerical identity between each compared value, or can be based on range, e.g., as where tissues of known morphology are associated with a range of RCDP values.

As reflected in step 2020, a relative centralized distance percent (RCDP) determined as discussed above can be displayed along with the PGM of interest (or otherwise) and it can inform the re-shading, colorizing and/or other display enhancement of growth rings (or "polygons") and/or PGMs (or "multi-polygon masses") as discussed, for example, in connection with FIG. 7 such that, more particularly and by way of non-limiting example, the system 10 can vary the nature and/or degree of such enhancement of a GR or PGM of which it forms a part as a function of the RCDP of a PGM of interest, all as is within the ken of those skilled in the art in view of the teachings hereof.

By way of further non-limiting example, such system 10 can highlight in one color or color range a PGM having a RCDP that falls in one numerical range and, in another color or color range, a PGM whose RCDP falls in another such range.

The RCDP of a PGM can, instead or in addition, inform its creation and/or the sorting of such growth rings (or polygons), e.g., as discussed above in connection with FIG. 5, and/or the assembly of PGMs (or multi-polygon objects), e.g., as discussed above in connection with FIG. 6, such that, more particularly and by way of non-limiting example, the system 10 can choose or, conversely, ignore growth rings as members of PGMs depending on RCDPs that would result from such choice.

A more complete understanding of the method shown in FIG. 20 and discussed above in connection therewith may be attained by reference to incorporated-by-reference ASCII file centralizedDensityCode-ASCII.txt, filed herewith.

Radiomics—Balance Determination

Figure 21:
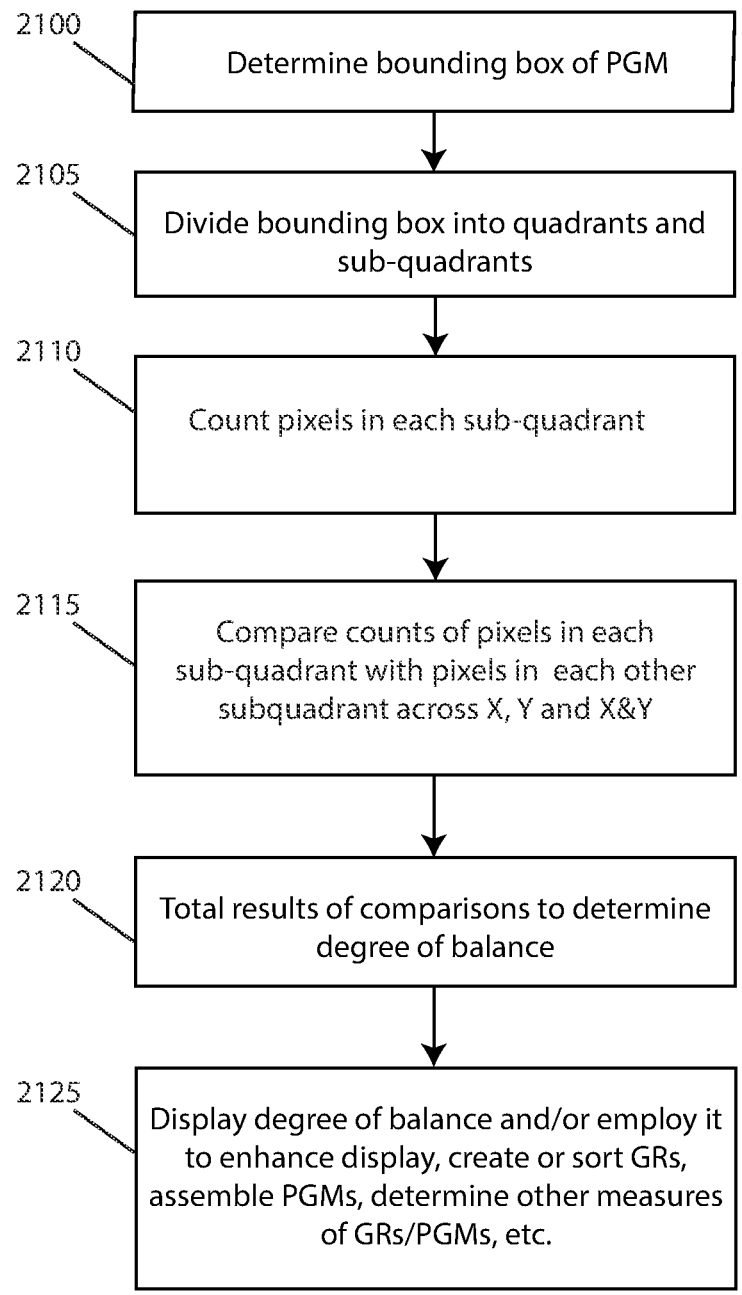
FIG. 21 depicts a method for balance determination according to the invention.
Figure 22A:
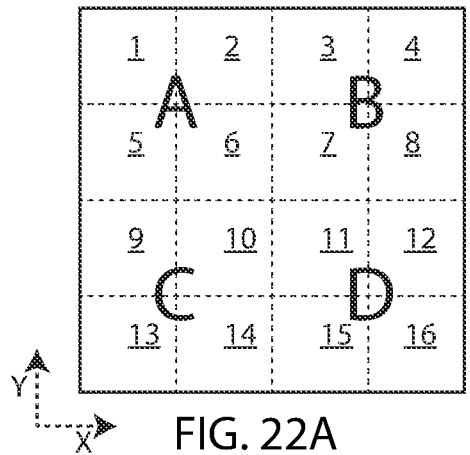
FIGS. 22A-22D depict a method for balance determination according to the invention.
Figure 22B:
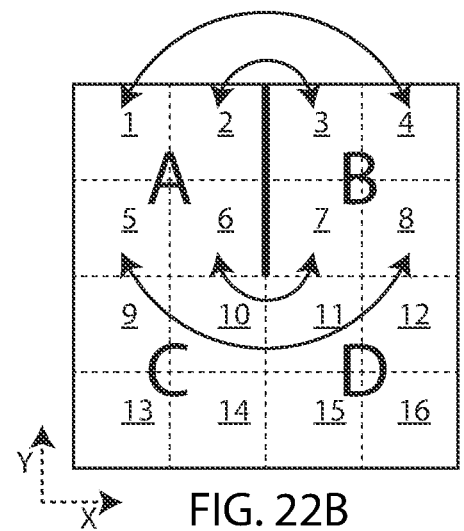
Figure 22C:
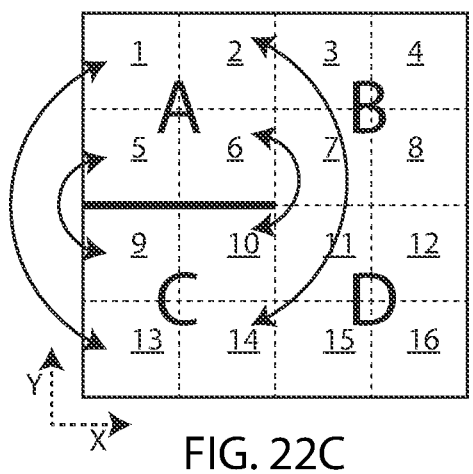
Figure 22D:
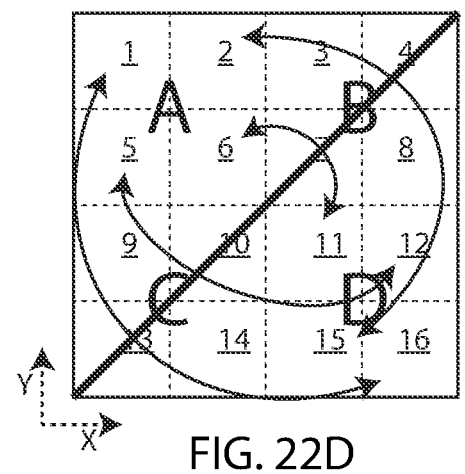

Referring to FIG. 21, system 10 and more particularly, for example, one or more of the client and/or server devices 12-18 can quantify (or determine the degree of) the balance of a PGM of interest—i.e., the symmetry of the pixels that make up the PGM across the X, Y and combined X/Y axes and, thereby, the symmetry of the mass or other tissues imaged by that PGM. As will be appreciated, the method described below can be applied to determining the degree of balance of a growth ring, as well.

As used in this section without loss of specificity or generality, the terms pixel gradation mass and PGM refer to a series of concentric growth rings, e.g., of the type the assembly of which is discussed above, e.g., in connection with FIG. 6. The programming of system 10 and, more particularly, devices 12-18 for practice of the method of FIG. 20 is within the ken of those skilled in the art in view of the teachings hereof.

In the embodiment shown in FIG. 21 and discussed below, it is assumed that the PGM of interest, if not the entire radiological, ultrasound or other image of which it forms a part, has been converted to grayscale. Other embodiments may perform such conversion prior to executing the method of FIG. 20. Still other embodiments may perform that method using, in lieu of the grayscale intensity values discussed below, intensity values that are computed directly from RGB or other pixel values contained in the PGM of interest or image of which it forms a part, all as is within the ken of those skilled in the art in view of the teachings hereof.

In step 2100, the illustrated method determines the bounding box of the PGM of interest. This can be a PGM identified by the user by way of a mouse, touch screen or otherwise, as is within the ken of those skilled in the art in view of the teachings thereof. Alternatively or in addition, the PGM of interest can be selected automatically (i.e., by operation of system 10) as part of the illustrated methodology, e.g., in connection with the determination of the degree of balance of one or more PGMs identified and/or displayed by system 10, again, as is within the ken of those skilled in the art in view of the teachings hereof.

Finding the bounding box of the PGM of interest is within the ken of those skilled in the art in view of the teachings hereof and can be performed by any of a number of techniques known in the art as adapted in accord with the teachings hereof. In the illustrated embodiment, the bounding box determination takes into account the intensities of all pixels lying within the outer boundary of the PGM, though, other embodiments may take into account only a subset of those pixels (e.g., those within user-selected inner concentric growth rings or otherwise).

In step 2105, the illustrated method divides the bounding box into equally-sized regions. See regions labelled A, B, C and D in companion FIG. 22A. Each region is, in turn, divided into equally-sized sub-regions. See sub-regions labelled 1-16 in companion FIG. 22A. Although the illustrated embodiment contemplates divisions of four and four, i.e., four regions and four sub-regions per region, other embodiments may vary in this regard, e.g., utilizing eight regions and sixteen sub-regions, by way of non-limiting example, or otherwise. In the discussion that follows, the regions and sub-regions are referred to as quadrants and sub-quadrants, respectively, without loss of generality or specificity.

Moreover, in the illustrated embodiment, the quadrants and sub-quadrants are aligned with X and Y axes of the radiographic, ultrasound or other image from which the PGM of interest was identified, though, in other embodiments, they may be aligned with X and Y axes based on principal moments of the PGM of interest or otherwise, all as is within the ken of those skilled in the art in view of the teachings hereof.

Division of the PGM of interest as contemplated in step 2105 is within the ken of those skilled in the art in view of the teachings hereof.

In step 2110, the illustrated method counts pixels in each sub-quadrant 1-16. In the illustrated embodiment, this contemplates counting only pixels above a threshold intensity level, e.g., 10 or 25 for radiographic images or the like (i.e., medical images in which "whiteness" represents most intensity) or below such an intensity level, e.g., 245 or 230 for ultrasound images or the like (i.e., medical images in which "darkness" represents most intensity), by way of non-limiting example; although, other embodiments may utilize different and/or multiple thresholds (in which case, for example, such counting is with respect to pixels within the multiple threshold intensities), all as is within the ken of those skilled in the art in view of the teachings hereof.

In step 2115, the illustrated method compares counts of pixels (above/below/within the applicable threshold(s)) in each sub-quadrant with pixels in each other sub-quadrant across the X-axis, as a line of symmetry; across the Y-axis, as a line of symmetry; and, across combined X- and Y-axes, as a line of symmetry.

This is illustrated with respect to the comparison of the pixels of sub-quadrants 1, 2, 5, 6 of quadrant A with respect to each the following:
  (i) pixels of sub-quadrants 3, 4, 7, 8 of quadrant B vis-à-vis symmetry across the Y-axis (as indicated by the dark vertical line separating those two quadrants in FIG. 22B). As indicated by the curved lines in that drawing, the specific comparisons are as follows, where each number is a sub-quadrant and "v" indicates a comparison:
    1 v 4
    2 v 3
    5 v 8
    6 v 7
  (ii) pixels of sub-quadrants 9, 10, 13, 14 of quadrant C vis-à-vis symmetry across the X-axis (as indicated by the dark horizontal line separating those two quadrants in the FIG. 22C). As indicated by the curved lines in that drawing, the specific comparisons are as follows, where each number is a sub-quadrant and "v" indicates a comparison:
    5 v 9
    6 v 10
    1 v 13
    2 v 14
  (iii) pixels of sub-quadrants 11, 12, 15, 16 of quadrant D vis-à-vis symmetry across combined X- and Y-axes (as indicated by the dark diagonal line separating those two quadrants in FIG. 22D). As indicated by the curved lines in that drawing, the specific comparisons are as follows, where each number is a sub-quadrant and "v" indicates a comparison:
    6 v 11
    2 v 15
    1 v 16
    5 v 12

Each comparison is a subtraction or, put another way, each comparison determines the difference in the number of pixels (each above/below/within the applicable threshold(s)) in each of the compared sub-quadrants. In some embodiments, the comparison additionally includes taking the absolute value of the result of each subtraction.

Detailed above are comparisons of the sub-quadrants of quadrant A with those of quadrants B, C and D. In like manner, step 2115 performs comparisons of the sub-quadrants of quadrant B with those of C and D; and, the sub-quadrants of quadrant C with those of D, all as is within the ken of those skilled in the art in view of the teachings hereof.

Comparing counts of pixels as described above is within the ken of those skilled in the art in view of the teachings hereof.

In step 2120, the illustrated method totals the results of the comparisons performed in step 2115. The resulting value is a measure or quantification of the degree of balance of the PGM of interest and, thereby, the mass or other tissues imaged by it.

The degree of balance of a PGM can, either alone or in conjunction with the spiculation quantification/characterization discussed in connection with FIG. 18, the normalized pixel density discussed in connection with FIG. 19, the relative centralized distance percent discussed in connection with FIG. 20, and/or the degree of pleomorphism discussed in connection with FIG. 23, inform characterizing that PGM as indicative, for example, of a potentially cancerous, non-cancerous (e.g., naturally-dense), or other mass, all as is within the ken of those skilled in the art in view of the teachings hereof.

Thus, for example, the illustrated method can compare the degree of balance of the PGM of interest with degrees of balance generated in a like manner (e.g., through exercise of steps 2100-215) for PGMs of tissues of known morphology, e.g., cancerous tissues, non-cancerous tissues, and so forth. Where the comparison is favorable, the growth ring can be characterized as possibly being of that morphology. The comparison can be strict in the sense of requiring numerical identity between each compared value, or can be based on range, e.g., as where tissues of known morphology are associated with a range of degrees of balance.

As reflected in step 2125, a degree of balance determined as discussed above can be displayed along with the PGM of interest (or otherwise) and it can inform the re-shading, colorizing and/or other display enhancement of growth rings (or "polygons") and/or PGMs (or "multi-polygon masses") as discussed, for example, in connection with FIG. 7 such that, more particularly and by way of non-limiting example, the system 10 can vary the nature and/or degree of such enhancement of a GR or PGM of which it forms a part as a function of the degree of balance of the PGM, all as is within the ken of those skilled in the art in view of the teachings hereof.

By way of further non-limiting example, such system 10 can highlight in one color or color range a PGM having a degree of balance that falls in one numerical range and, in another color or color range, a PGM whose degree of balance falls in another such range.

The degree of balance of a PGM can, instead or in addition, inform its creation and/or the sorting of such growth rings (or polygons), e.g., as discussed above in connection with FIG. 5, and/or the assembly of PGMs (or multi-polygon objects), e.g., as discussed above in connection with FIG. 6, such that, more particularly and by way of non-limiting example, the system 10 can choose or, conversely, ignore growth rings as members of PGMs depending on the resulting degree of balance imbued by those growth rings to the PGM as a whole.

By way of further non-limiting example, such system 10 can employ the degree of balance to choose among growth rings whose perimeters would otherwise form an outer boundary of a multi-polygon PGM. Such a use of degrees of balance can affect not only enhancement and display of PGMs but also (i) their respective Attenuation Quotients and other measures (e.g., dimensions, density, whiteness/darkness, and so forth), e.g., as discussed above in connection with FIG. 7 and in connection with the section entitled "Example" and (ii) searching and comparison among masses, e.g., as discussed above in connection with FIG. 8, all by way of non-limiting example, and all as within the ken of those skilled in the art in view of the teachings hereof.

A more complete understanding of the method shown in FIGS. 21-22 and discussed above in connection therewith may be attained by reference to incorporated-by-reference ASCII file lesionBalanceCode-ASCII.txt, filed herewith.

Radiomics—Pleomorphism Determination

Figure 23:
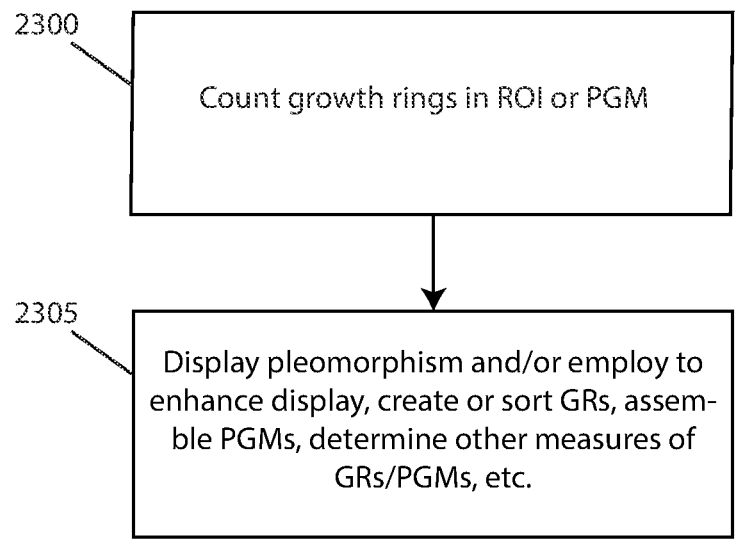
FIG. 23 depicts a method for pleomorphism determination according to the invention.

Referring to FIG. 23, system 10 and more particularly, for example, one or more of the client and/or server devices 12-18 can quantify (or determine the degree of) pleomorphism of a region of interest (ROI) and/or of a PGM of interest. Pleomorphism is the total count of growth rings in the ROI or PGM of interest.

As used in this section without loss of specificity or generality, the terms pixel gradation mass and PGM refer to a series of concentric growth rings, e.g., of the type the assembly of which is discussed above, e.g., in connection with FIG. 6. The programming of system 10 and, more particularly, devices 12-18 for practice of the method of FIG. 20 is within the ken of those skilled in the art in view of the teachings hereof.

In step 2300, the illustrated method counts the number of growth rings in an ROI or PGM of interest. This can be an ROI or PGM identified by the user by way of a mouse, touch screen or otherwise, as is within the ken of those skilled in the art in view of the teachings thereof. Alternatively or in addition, the ROI or PGM of interest can be selected automatically (i.e., by operation of system 10) as part of the illustrated methodology, e.g., in connection with the determination of the degree of balance of one or more PGMs identified and/or displayed by system 10, again, as is within the ken of those skilled in the art in view of the teachings hereof.

Counting the growth rings in the ROI or PGM of interest is within the ken of those skilled in the art in view of the teachings hereof and can be performed by any of a number of techniques known in the art as adapted in accord with the teachings hereof. In the illustrated embodiment, for example, this is accomplished by surveying data structures employed within the software and counting the number of GRs having boundaries that lie within the ROI/PGM of interest. In some embodiments, counting is limited to GRs having specified characteristics, e.g., average pixel intensities above a threshold, and so forth, all as is within the ken of those skilled in the art in view of the teachings hereof.

The degree of pleomorphism of a PGM can, either alone or in conjunction with the spiculation quantification/characterization discussed in connection with FIG. 18, the normalized pixel density discussed in connection with FIG. 19, the relative centralized distance percent discussed in connection with FIG. 20, and/or the balance determination discussed in connection with FIGS. 21-22, inform characterizing that PGM as indicative, for example, of a potentially cancerous, non-cancerous (e.g., naturally-dense), or other mass, all as is within the ken of those skilled in the art in view of the teachings hereof.

Thus, for example, the illustrated method can compare the degree of pleomorphism of the PGM of interest with degrees of pleomorphism generated in a like manner (e.g., through exercise of step 2300) for PGMs of tissues of known morphology, e.g., cancerous tissues, non-cancerous tissues, and so forth. Where the comparison is favorable, the growth ring can be characterized as possibly being of that morphology. The comparison can be strict in the sense of requiring numerical identity between each compared value, or can be based on range, e.g., as where tissues of known morphology are associated with a range of degrees of pleomorphism.

As reflected in step 2305, a degree of pleomorphism determined as discussed above can be displayed along with the ROI/PGM of interest (or otherwise) and it can inform the re-shading, colorizing and/or other display enhancement of growth rings (or "polygons") and/or PGMs (or "multi-polygon masses") as discussed, for example, in connection with FIG. 7 such that, more particularly and by way of non-limiting example, the system 10 can vary the nature and/or degree of such enhancement of a GR or PGM of which it forms a part as a function of the degree of pleomorphism of the ROI/PGM of interest, all as is within the ken of those skilled in the art in view of the teachings hereof.

By way of further non-limiting example, such system 10 can highlight in one color or color range a PGM having a degree of pleomorphism that falls in one numerical range and, in another color or color range, a PGM whose degree of pleomorphism falls in another such range.

The degree of pleomorphism of a PGM can, instead or in addition, inform its creation and/or the sorting of such growth rings (or polygons), e.g., as discussed above in connection with FIG. 5, and/or the assembly of PGMs (or multi-polygon objects), e.g., as discussed above in connection with FIG. 6, such that, more particularly and by way of non-limiting example, the system 10 can choose or, conversely, ignore growth rings as members of PGMs depending on the resulting degree of pleomorphism imbued by those growth rings to the PGM as a whole.

By way of further non-limiting example, such system 10 can employ the degree of pleomorphism to choose among growth rings whose perimeters would otherwise form an outer boundary of a multi-polygon PGM. Such a use of degrees of pleomorphism can affect not only enhancement and display of PGMs but also (i) their respective Attenuation Quotients and other measures (e.g., dimensions, density, whiteness/darkness, and so forth), e.g., as discussed above in connection with FIG. 7 and in connection with the section entitled "Example" and (ii) searching and comparison among masses, e.g., as discussed above in connection with FIG. 8, all by way of non-limiting example, and all as within the ken of those skilled in the art in view of the teachings hereof.

A more complete understanding of the method shown in FIG. 23 and discussed above in connection therewith may be attained by reference to incorporated-by-reference ASCII file centralizedDensityCode-ASCII.txt, filed herewith.

A more complete understanding of the methods shown in FIGS. 18-23 and discussed above in connection therewith may be attained by reference to incorporated-by-reference ASCII file additionalDensitySupportcode-ASCII.txt, filed herewith.

CONCLUSION

Described above systems, apparatus and methods meeting the objects set forth previously. It will be appreciated that the illustrated embodiments are merely examples of the invention and that other embodiments incorporating changes to those shown here fall within the scope of the invention.

The invention claimed is:

1. A method comprising
   A. walking the perimeter of a shape in a medical image to generate a list of coordinates defining that perimeter,
   B. dividing the list into groups of coordinates divided by inflection points on the perimeter,
   C. determining for each group of coordinates a span-to-length ratio, where span refers to a distance on a cartesian coordinate system between endpoints of the respective group, and where length refers to a sum of distances measured moving along a path defined by the respective group, D. determining respective percentages that groups having selected span-to-length ratios comprise of a length of the perimeter, and E. any of enhancing the medical image or identifying a morphology of a tissue imaged in the medical image as a function of those respective percentages.

2. The method of claim 1, wherein the span-to-length ratios are greater than zero and less than or equal to one, with a group that defines a straight segment having a span-to-length ratio of one and a group that deviates from straight having a lesser such ratio.

3. The method of claim 1, wherein step (D) comprises
i. binning the groups in accord with their respective span-to-length ratios and for each bin (a) totalling lengths of the groups in that bin and (b) determining what percentage that total comprises of the length of the perimeter of the shape in total.

4. The method of claim 3, wherein step (D) comprises
ii. binning the percentages generated in step (D)(i)(b) into superbins based on the span-to-length ratios of the bins for which those percentages were determined.

5. The method of claim 4, wherein step (D) comprises
iii. totalling at least selected percentages binned in step (D)(ii).

6. The method of claim 1, wherein step (E) comprises comparing the respective percentages with corresponding percentages determined for a tissue of known morphology.

7. The method of claim 6, wherein step (E) comprises responding to a favorable comparison by characterizing the shape as being of that morphology.

8. The method of claim 7, wherein step (E) comprises performing the comparisons using ranges of values for one or more of the percentages.

9. The method of claim 1, wherein step (D) comprises determining respective percentages that groups having span-to-length ratios of at least one of 0.6-0.7, 0.7-0.8, 0.8-0.9 and 0.9-1.0 comprise of a length of the perimeter.

10. The method of claim 1, wherein step (D) comprises determining respective percentages that groups having span-to-length ratios of at least two of 0.6-0.7, 0.7-0.8, 0.8-0.9 and 0.9-1.0 comprise of a length of the perimeter.

11. The method of claim 1, wherein step (D) comprises determining respective percentages that groups having span-to-length ratios of 0.6-0.7, 0.7-0.8, 0.8-0.9 and 0.9-1.0 comprise of a length of the perimeter.

12. The method of claim 1, wherein step (E) comprises displaying any of the respective percentages determined in step (D) or a morphology characterization based thereon.

13. The method of claim 1, wherein step (E) comprises any of re-shading, colorizing and/or otherwise enhancing display of the shape based on any of the respective percentage determined in step (D) or a morphology characterization based thereon.

14. The method of claim 1, comprising determining whether the shape is an outer boundary of a concentric set of shapes in the medical image based on any of the respective percentages determined in step (D) or a morphology characterization based thereon.

15. The method of claim 14 comprising determining characteristics of the concentric set of shapes and tissues imaged thereby based on any of the respective percentages determined in step (D) or a morphology characterization based thereon.

16. The method of claim 1, wherein step (E) comprises identifying a morphology of a tissue imaged in the medical image as a function of the respective percentages in combination with one or more of a normalized pixel density of the shape, a relative centralized distance percent of a series of concentric shapes, a degree of balance of the series of concentric shapes, and a degree of pleomorphism of the series of concentric shapes.

* * * * *